United States Patent
Troy et al.

(10) Patent No.: US 11,939,081 B2
(45) Date of Patent: Mar. 26, 2024

(54) END EFFECTORS WITH MULTI-AXIS ROLLER WHEELS, SYSTEMS INCLUDING THE SAME, AND RELATED METHODS

(71) Applicant: The Boeing Company, Chicago, IL (US)

(72) Inventors: James J. Troy, Issaquah, WA (US); Daniel M. Simunovic, Titusville, FL (US); Gary E. Georgeson, Tacoma, WA (US); Joseph Lawrence Hafenrichter, Auburn, WA (US)

(73) Assignee: THE BOEING COMPANY, Arlington, VA (US)

( * ) Notice: Subject to any disclaimer, the term of this patent is extended or adjusted under 35 U.S.C. 154(b) by 177 days.

(21) Appl. No.: 17/551,049

(22) Filed: Dec. 14, 2021

(65) Prior Publication Data
US 2023/0182922 A1 Jun. 15, 2023

(51) Int. Cl.
*B64F 1/02* (2006.01)

(52) U.S. Cl.
CPC .................. *B64F 1/0299* (2020.01)

(58) Field of Classification Search
CPC .................................................. B64F 1/0299
See application file for complete search history.

(56) References Cited

U.S. PATENT DOCUMENTS

| | | | | |
|---|---|---|---|---|
| 4,964,062 A | * | 10/1990 | Ubhayakar | G05B 19/4141 244/172.6 |
| 6,523,784 B2 | * | 2/2003 | Steinsiek | B64G 1/646 244/172.6 |
| 7,643,893 B2 | | 1/2010 | Troy et al. | |
| 8,052,092 B2 | * | 11/2011 | Atmur | B64G 1/66 244/172.6 |

(Continued)

FOREIGN PATENT DOCUMENTS

| | | |
|---|---|---|
| CN | 108516112 A | 9/2018 |
| CN | 111745670 A | 10/2020 |

OTHER PUBLICATIONS

"'Quick-thinking' robot arm helps MIT researchers catch on to brain function," MIT News, Mar. 11, 1998, downloaded from news.mit.edu/1998/wam.

(Continued)

*Primary Examiner* — Justin M Benedik
(74) *Attorney, Agent, or Firm* — Kolitch Romano Dascenzo Gates LLC

(57) ABSTRACT

End effectors and systems may capture, release, and/or create a mating engagement between the end effector and a target object. Said end effectors are tolerant of positional and rotational misalignment of the target object, and include a plurality of roller wheels, one or more of which is arranged in a non-parallel plane with respect to one or more other roller wheels. A first roller wheel configured to rotate in a first plane, a second roller wheel configured to rotate in a second plane, and a third roller wheel configured to rotate in (Continued)

a third plane may be arranged such that the end effector is configured to engage a passive receptacle of the target object, to capture the target object. Rotating the roller wheels in the opposite direction may cause the target object to be released or launched, by urging the passive receptacle off of or away from the roller wheels.

22 Claims, 18 Drawing Sheets

(56) References Cited

U.S. PATENT DOCUMENTS

| | | | |
|---|---|---|---|
| 10,286,556 | B2 | 5/2019 | Troy et al. |
| 2008/0237400 | A1* | 10/2008 | Gryniewski ............. B64G 1/14 244/172.4 |
| 2010/0193640 | A1* | 8/2010 | Atmur .................... B64G 1/242 244/158.2 |
| 2013/0336755 | A1* | 12/2013 | Neeper ................... B25J 15/10 414/800 |
| 2015/0239578 | A1* | 8/2015 | McGeer ................... B64F 1/04 901/31 |
| 2017/0036783 | A1* | 2/2017 | Snyder .................. B23K 9/044 |
| 2020/0290200 | A1* | 9/2020 | Wagner .................. B25J 9/1612 |
| 2020/0407061 | A1 | 12/2020 | Hafenrichter et al. |
| 2020/0407197 | A1 | 12/2020 | Hafenrichter et al. |

OTHER PUBLICATIONS

Dzitac et al. "A method to control grip force and slippage for robotic object grasping and manipulations," Preprints of the 2012 20$^{th}$ Mediterranean Conference on Control & Automation (MED), Barcelona, Spain, Jul. 3-6, 2012, pp. 116-121.

End of Arm Tooling, Inc., IGP 14 ID Expansion Gripper, product information downloaded Oct. 1, 2021 from oat.net/components/id-expansion-gripper-igp/igp-14-id-expansion-gripper/.

Ackerman, Evan, "We Can Do Better Than Human-Like Hands for Robots," IEEE Spectrum, Jun. 9, 2020, downloaded from spectrum.ieee.org/we-can-do-better-than-humanlike-hands-for-robots#toggle-gdpr.

Exploding Bacon First robotics team 1902 roller gripper prototype 2011, still from Video dated Jan. 25, 2011, available at youtube.com/watch?v=-hF-WXeyuyk.

Backlash—The Robot, 2019 FRC Season—Destination: Deep Space, information downloaded from www.team254.com/first/2019/.

European Patent Office, Extended European Search Report for related application EP 22 212 930, dated May 10, 2023.

Machine-generated English language translation for CN 111745670A, Oct. 9, 2020.

Machine-generated English language translation for CN 108516112A, Sep. 11, 2018.

* cited by examiner

END EFFECTORS WITH MULTI-AXIS ROLLER WHEELS, SYSTEMS INCLUDING THE SAME, AND RELATED METHODS

FIELD

The present disclosure relates generally to end effectors and more particularly to end effectors with two or more roller wheels that are arranged to rotate in different planes and configured to capture and/or release objects via passive receptacles.

BACKGROUND

The ability to grab, capture, or mate with an aircraft, such as an unmanned aerial vehicle (UAV) or other small hovering aircraft, is often desirable, especially when requiring it to land in a safe location is a concern for operators of these types of vehicles. For example, landing, grabbing, capturing, and/or mating with such aircraft may be difficult when they are operating in adverse and/or unpredictable conditions (e.g., windy weather), in environments with rough terrain where there is no level location to land, and/or via a moving platform such as a boat or ship. Safely releasing or launching aircraft in these conditions is also challenging.

While there are some systems that address some of these problems, those solutions may not be adaptable to hovering UAVs, such as quadrotor or coaxial rotor vehicles. Attempts have been made to grasp hovering vehicles from the air using traditional articulated robotic grippers or locking interface devices combined with low latency vision systems and high-speed robotic manipulator arms that can quickly actuate to grab a mating receptacle on the moving vehicle. To safely and consistently capture a hovering aircraft or other target object, high-speed vision systems are often needed to achieve precise alignment with the moving target object, along with precise three-dimensional localization and timing, which are complex and can be expensive and difficult to maintain in the field. Additionally, misalignment between these types of grippers and the target object (such as due to a limited range of viable approach angles) risks inflicting damage to the target object when attempting to capture it, thus allowing for little to no error tolerance. These challenges are amplified by the often rapidly changing position and orientation of the aircraft or other object with respect to the capture device (either or both of which may be in motion).

Capturing a flying or hovering object that can move with six degrees-of-freedom requires either very precise alignment of the gripper, or a gripper that can tolerate significant misalignment with the hovering object. The challenges of approaches that rely on very precise alignment are discussed above. Other existing types of grippers and end effectors are not suitable for grasping hovering aircraft and the like, because they do not support multi-axis misalignment to allow for the multi-dimensional capture required when capturing hovering aircraft. There thus remains a need for an improved capture device for capturing or mating with aircraft and other target objects, that allows the target object to approach from any angle covering a full 360 degree range of heading angles, and that can tolerate adverse and unpredictable conditions that may cause misalignment of the target object.

SUMMARY

Presently disclosed end effectors and systems may be configured to enable capture, release of, and/or mating between the end effector and a hovering aircraft or other target object (also referred to herein simply as "object"). Said end effectors may be configured to provide multi-axis capture capability that is tolerant of positional and rotational misalignment of the target object, including the ability to capture objects with a full 360 degree range of approach heading angles respect to the end effector, and may be configured to be operated in manual or automated modes from stationary or moving platforms. Said end effectors may be modular such that they may be configured or reconfigured for different applications. Disclosed end effectors generally include a plurality of multi-directional roller wheels at least one of which are in non-parallel rotation planes, though they may be arranged in a plurality of different patterns and arrangements of axes.

In a representative example, an end effector may include a first roller wheel configured to rotate in a first plane, a second roller wheel configured to rotate in a second plane, and a third roller wheel configured to rotate in a third plane. The second plane may be non-parallel to the first plane, and/or the third plane may be non-parallel to the first plane and/or the second plane. The first roller wheel, the second roller wheel, and the third roller wheel may be arranged with respect to one another such that the end effector is configured to capture an object via the first roller wheel, the second roller wheel, and the third roller wheel. The end effector may be further configured to selectively release the object from the first roller wheel, the second roller wheel, and the third roller wheel.

In a representative example, an end effector may include a first roller wheel configured to rotate in a first plane, with the first roller wheel being supported by a support element, and a second roller wheel configured to rotate in a second plane, with the second roller wheel also being supported by the support element. Again, the second plane may be non-parallel to the first plane. End effectors according to the present disclosure also may include a backstop supported by the support element. The backstop may be positioned to engage with an object when the object is captured by the first roller wheel and the second roller wheel. The first roller wheel, the second roller wheel, and the backstop may be arranged with respect to one another such that the end effector may be configured to capture the object via the first roller wheel, the second roller wheel, and the backstop. Furthermore, the end effector may be configured to selectively release the object from the first roller wheel, the second roller wheel, and the backstop.

Disclosed systems may include an end effector according to the present disclosure, a support structure that is coupled to and supports the end effector, and a target object which the system is designed to capture, release, and/or mate with. The object may include a passive receptacle via which the end effector is configured to capture the object. For example, the end effector may be configured to engage the passive receptacle of the object in order to capture the object, and release the passive receptacle to release the object.

Disclosed methods of capturing an object may include approaching an end effector with a passive receptacle of the object, contacting the first roller wheel, the second roller wheel, and/or the third roller wheel of the end effector with the passive receptacle, and capturing the passive receptacle via the end effector. In order to capture the passive receptacle, disclosed methods may include rotating the wheels inward (toward the center of the end effector), which consists of rotating the first roller wheel in a first direction, rotating the second roller wheel in a second direction, and rotating the third roller wheel in a third direction, thereby pulling at least a portion of the passive receptacle past a first centerline of the first roller wheel, past a second centerline of the second roller wheel, and past a third centerline of the third roller wheel. To release the object, the directions of rotation of the first roller wheel, the second roller wheel, and the third roller wheel may be reversed, thereby pushing the passive receptacle past the respective centerlines of the roller wheels in the opposite direction, thereby releasing the object via releasing the passive receptacle.

DESCRIPTION

Figure 1:
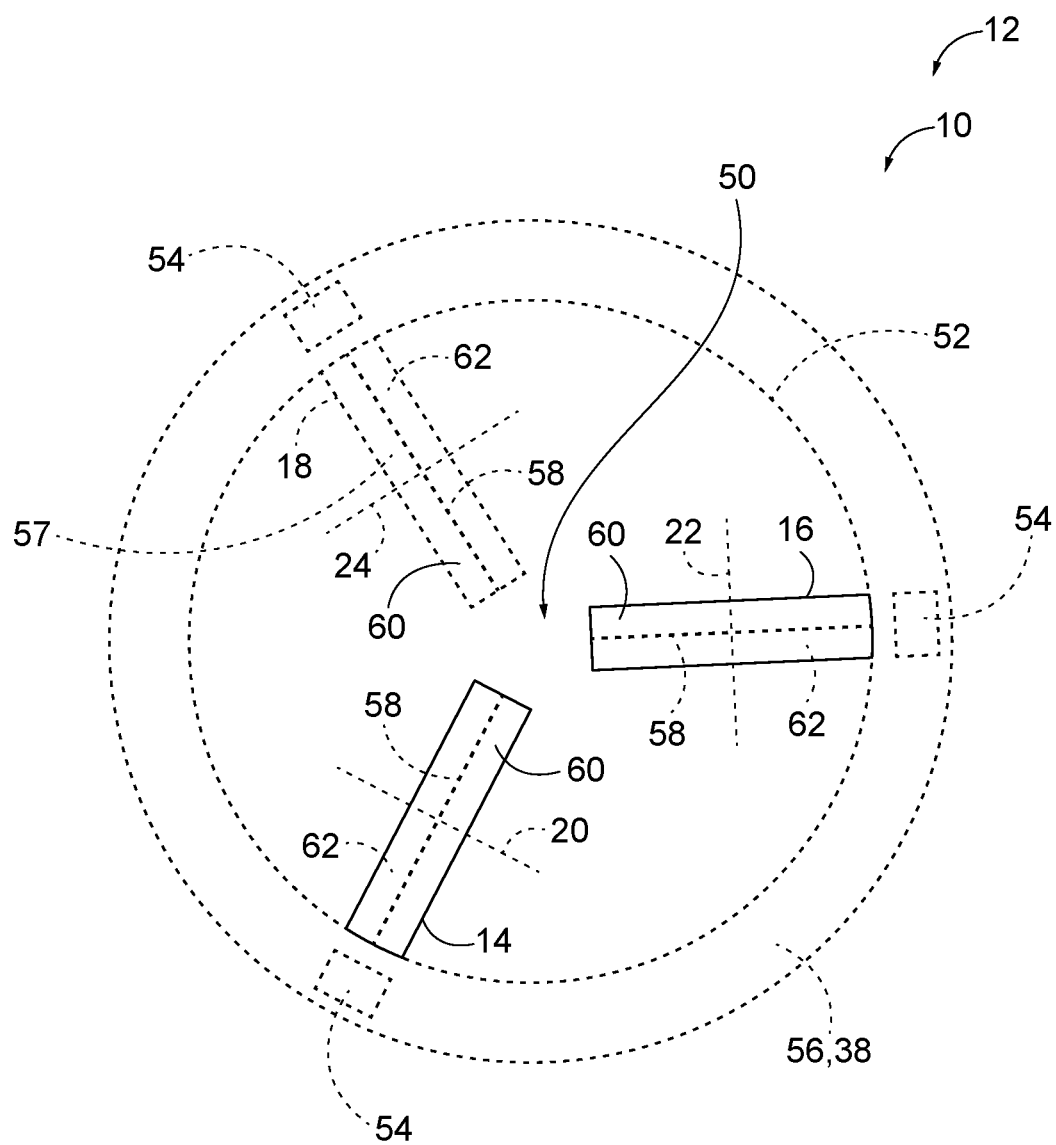
FIG. 1 is a top plan schematic representation of non-exclusive examples of end effectors and systems including the same, according to the present disclosure.

FIGS. 1-14 provide illustrative, non-exclusive examples of systems 12 and end effectors 10 according to the present disclosure. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure. Additional schematic views are presented later, in FIGS. 18, 19, and 26-30, which also follow the conventions above. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

Figure 2:
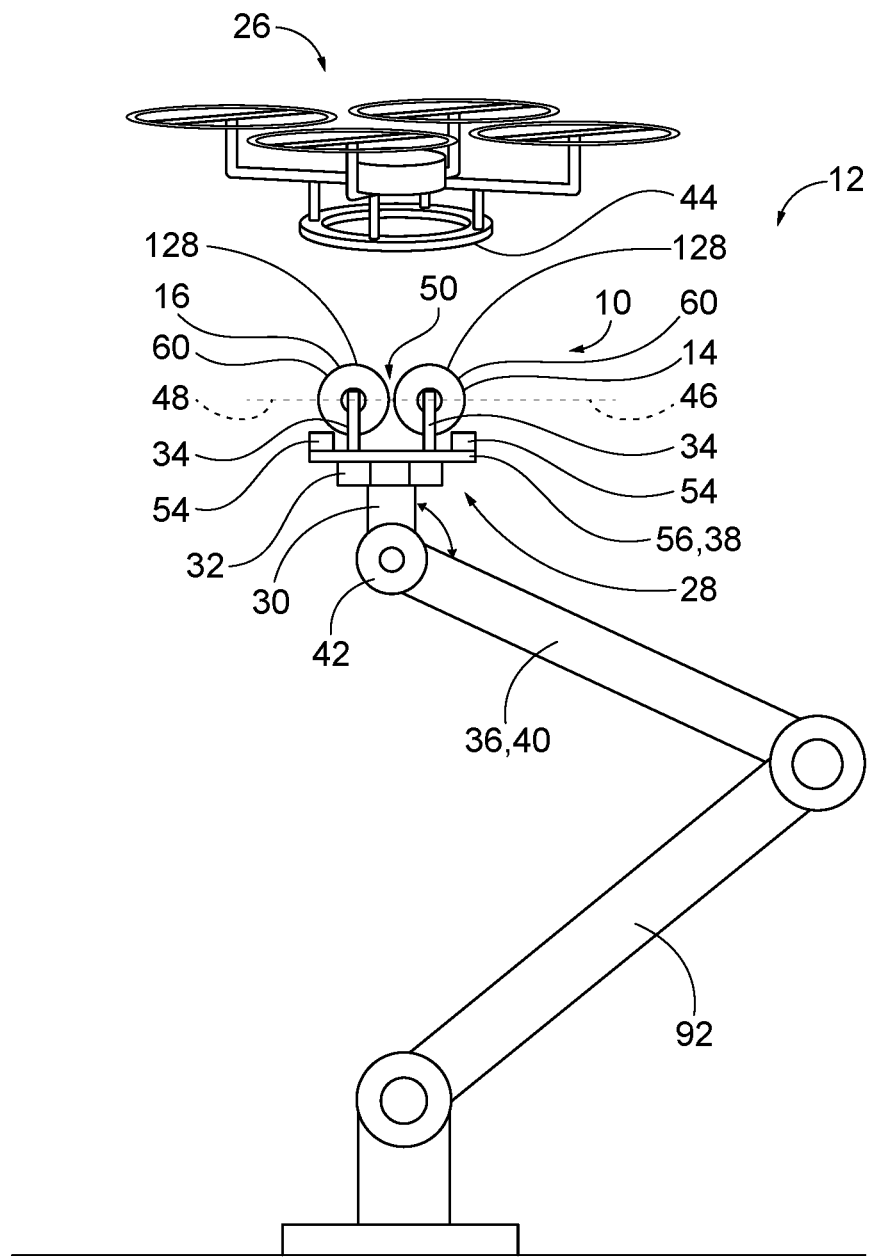
FIG. 2 is a side elevation schematic representation of non-exclusive examples of end effectors and systems including the same, according to the present disclosure.

FIGS. 1-2 schematically represent examples of end effectors 10 of systems 12 of the present disclosure. FIG. 1 schematically represents non-exclusive examples of end effectors 10 viewed from a top plan view, while FIG. 2 schematically represents non-exclusive examples of end effectors 10 viewed from a side elevation view. End effector 10 includes at least a first roller wheel 14 and a second roller wheel 16, and may include one or more additional roller wheels, such as a third roller wheel 18, which is indicated in FIG. 1, but is not shown in FIG. 2, for clarity. Some examples of end effectors 10 include a fourth roller wheel, and/or even further additional roller wheels.

One or more of the roller wheels (e.g., roller wheels 14, 16, 18) rotates in different (e.g., non-parallel) respective plane and/or rotate about a different respective axis than one or more other of the roller wheels. In some examples, each roller wheel may rotate in a different respective plane and rotate about a different respective axis than each other of the roller wheels in a given end effector 10. In some examples, two roller wheels may rotate in the same plane, while two other roller wheels may rotate in a different plane. In other words, in examples of end effectors 10 having an even number of roller wheels (but greater than three roller wheels), one or more pairs of roller wheels may share a plane of rotation. In some examples, first roller wheel 14 may be said to rotate in a first plane, and second roller wheel 16 may be said to rotate in a second plane, with the first and second planes being non-parallel to one another. In examples of end effectors 10 that include third roller wheel 18, third roller wheel 18 may rotate in a third plane that is non-parallel to the plane of rotation of first roller wheel 14 and/or the plane of rotation of second roller wheel 16. Additionally or alternatively, one or more planes of rotation of roller wheels 14, 16, 18 may be at least substantially perpendicular to a support base 38 supporting the roller wheels. Additionally or alternatively, one or more planes of rotation of roller wheels 14, 16, 18 may be arranged at a non-perpendicular angle with respect to support base 38. Roller wheels 14, 16, 18 may be arranged such that the first plane, second plane, and/or third plane intersect with one another.

In some examples, some or all of respective roller wheels 14, 16, and/or 18 may rotate about a different and/or non-parallel respective axis, which is represented in FIG. 1 for illustrative purposes. In some examples, each respective roller wheel of end effector 10 rotates about a different respective axis. In some examples, one or more roller wheels of end effector 10 may rotate about an axis that is at least substantially parallel to that of one or more other roller wheels of end effector 10. In some examples, at least one roller wheel of end effector 10 rotates about an axis that is non-parallel to at least one other roller wheel of the end effector. As shown in FIG. 1, first roller wheel 14 may rotate about first axis 20, second roller wheel 16 may rotate about second axis 22, and third roller wheel 18 may rotate about third axis 24. As shown in FIG. 1, each of first axis 20, second axis 22, and third axis 24 are arranged at non-parallel angles with respect to one another. In some examples, each of first axis 20, second axis 22, and third axis 24 are arranged at non-perpendicular angles with respect to one another, though in some examples of end effectors 10, one or more such axes may be at least substantially perpendicular to one another and/or arranged at different angles with respect to one another. End effectors 10 may include additional roller wheels and/or roller wheels arranged in different spacings, orientations, and/or patterns, as discussed herein. Representative examples will primarily be described as having three roller wheels 14, 16, and 18, though end effectors 10 according to the present disclosure are not limited to the same.

End effectors 10 are configured to selectively capture, mate with, and/or release an object 26 via two or more roller wheels (e.g., roller wheels 14, 16, and/or 18). End effectors 10 may be configured to capture and mate with objects 26 approaching from any direction, thereby allowing for a full 360 degree range of heading angles. This allows for disclosed end effectors 10 to tolerate misalignment in any direction, which was not possible in prior art systems. The roller wheels 14, 16, 18 may be oriented and arranged with respect to one another to allow disclosed end effectors 10 to have this capability. For example, in end effectors 10 with three roller wheels 14, 16, 18, the roller wheels may be arranged and oriented such that each respective roller wheel rotates about a different respective non-parallel axis. This arrangement may enable end effectors 10 to capture objects 26 approaching from a full 360 degree range of heading angles, though other arrangements disclosed herein also may have this ability as well.

Roller wheels 14, 16, 18 may be rotated in opposite respective directions for capturing and releasing objects 26. For example, roller wheels 14, 16, 18 of end effector 10 may be rotated in a first respective direction when capturing or mating with object 26, and then may be reversed to rotate in the opposite respective direction to selectively release object 26. In other words, each roller wheel 14, 16, 18 may be configured to be selectively reversed between two opposite directions of rotation. In some examples, the directions of rotation of roller wheels 14, 16, 18 may be said to be "inward" (e.g., roller wheels 14, 16, 18 may be rotated towards an interior space 50 between the roller wheels) in one configuration, and "outward" when the roller wheels are rotated in the opposite direction. One or more of roller wheels 14, 16, 18 may be rotated in a different direction than one or more other of roller wheels 14, 16, 18 during capture, mating with, and/or release of object 26. Additionally or alternatively, the speed of rotation of one or more of roller wheels 14, 16, 18 may be selectively increased or decreased during capture or release of object 26.

Object 26 may be floating, hovering, positioned, and/or flying above, beside, below, and/or adjacent end effector 10 in various applications of capturing and/or mating with object 26. End effector 10 additionally or alternatively may be configured to capture or mate with a stationary object 26 while end effector 10 is moved to the stationary object 26. End effectors 10 are designed to capture and/or mate with object 26 even when the object 26 is misaligned from end effector 10 along one or more positional and/or rotational axes. To capture, mate with, and/or release objects 26, end effector 10 is configured to engage with a passive receptacle 44 of object 26. Passive receptacle 44 may be integrally formed with object 26, or may be permanently or temporarily coupled thereto. Passive receptacle 44 is generally arranged with respect to object 26 such that passive receptacle 44 is configured to be oriented towards end effector 10 during capture of object 26. In other words, when object 26 is approaching end effector 10 (or vice versa), object 26 may be configured such that passive receptacle 44 reaches end effector 10 first, to facilitate engagement between end effector 10 and passive receptacle 44, rather than contact with a different part of object 26.

The schematic representation of FIG. 2 illustrates object 26 in the form of a UAV hovering above end effector 10, though systems 12 are not limited to the same. For example, object 26 may be a hovering or other type of aircraft (e.g., a UAV, or drone, or manned aircraft), a package, a load, a cable end, and/or an emergency device that is configured to carry and/or lift a person or animal. In some examples, end effector 10 may be mated with object 26 in adverse and/or unpredictable conditions, such as in refueling flying aircraft situations. In examples involving UAVs or other aircraft as objects 26, the aircraft may be a fixed wing aircraft, a quadcopter, a helicopter, a multirotor, a rotorcraft, a military aircraft, a vertical take-off and landing (VTOL) aircraft, a short take-off and vertical landing (STOVL) aircraft, a low observable UAV, and/or an aircraft without landing gear. Other types of objects 26 may be fitted with passive receptacles 44 to engage end effectors 10 disclosed herein to be utilized with disclosed systems 12.

Presently disclosed systems 12 and end effectors 10 may be used to capture and/or release an aerial vehicle, and/or to lift and/or load a package or load, and may be used for commercial applications, military applications, and/or personal applications. Systems 12 and end effectors 10 may address the shortcomings with conventional solutions because presently disclosed end effectors 10 and systems 12 may be configured to capture and/or mate with objects in adverse and/or unpredictable conditions, and/or in instances with positional and/or rotational misalignment between the end effector and the object, such as when the end effector and/or the object are in motion. In other examples, systems 12 may be used for applications involving mating components, such as in as manufacturing (e.g., robotic material handling), aerial refueling systems, and agriculture usages (e.g. picking fruit and other agricultural products). Disclosed systems 12 and end effectors 10 may create cost savings and/or cost avoidance as compared to conventional solutions, such as due to avoidance or reduction of injuries and/or hardware wear. In some examples, end effectors 10 and systems 12 may improve safety for operators and the objects 26 being captured or mated with, as compared to conventional solutions. Presently disclosed systems 12 and end effectors 10 also advantageously have the ability to operate spatially in three dimensions, with multi-axis capture capability. Systems 12 and end effectors 10 also are configured to be scalable to be adapted for larger or smaller objects 26 being captured, mated with, and/or launched. Additionally, systems 12 and end effectors 10 may be selectively reconfigurable to have different numbers of roller wheels, and/or different arrangements and positioning of the roller wheels 14, 16, 18.

Systems 12 may include a drive system 28 (FIG. 2) configured to control rotation of first roller wheel 14, second roller wheel 16, and/or third roller wheel 18. For example, drive system 28 may include one or more rotational power sources 30, one or more drive gears 32, and one or more drive shafts 34. While rotational power sources 30 are generally described herein as motors 30, it is to be understood that rotational power sources 30 may include one or more electric motors, a pneumatic power source, a hydraulic motor or other hydraulic power source, a spring-powered power source (e.g., wind-up rotatable power sources), manually powered (e.g., hand cranks), and/or air powered (e.g., a rotary vane air device) sources. In some examples, drive system 28 includes a single motor 30 that drives first roller wheel 14, second roller wheel 16, and third roller wheel 18. In some examples, drive system 28 includes a respective motor 30 for each respective roller wheel. As will be described in more detail herein, drive gears 32 of drive system 28 may include a central control gear or external control gear ring, and a plurality of radially spaced spur gears, with the central control gear or external control gear ring being configured to rotate the plurality of radially spaced spur gears, and each respective spur gear being configured to drive a respective roller wheel 14, 16, 18 by driving a respective drive shaft 34. In some examples, drive gears 32 include a set of planetary and internal gears. Drive systems 28 additionally or alternatively may include a limit switch configured to stop first roller wheel 14, second roller wheel 16, and/or third roller wheel 18 after object 26 is captured by end effector 10. End effectors 10 may be configured for manual and/or automated operation (e.g., manual or automated capture, mating with, and/or release of object 26).

With continued reference to FIGS. 1-2, end effector 10 may be coupled to, mounted to, and/or supported by a support structure 36, such as an arm, a pole, a handle, and/or a platform (stationary or moving). For example, support structure 36 of FIG. 2 is illustrated in the form of a robotic arm 40, which may be coupled to drive system 28 via an adjustable joint angle 42. Robotic arm 40 is illustrated as a stationary robotic arm 40, though in other examples of systems 12, robotic arm 40 may be an arm of a mobile robot. In other examples of system 12, end effector 10 may be coupled to other types of support structures 36 via adjustable joint angle 42. For example, end effector 10 may be coupled to a handle for handheld or manual operation in some systems 12. In other examples, end effector 10 may be supported by an arm support structure 36 that is mounted on a ship-based mounting platform or other moving vehicle. In these and other setups for supporting end effector 10, support structure 36 may be used to help in aligning end effector 10 for mating with or capturing object 26 by positioning and/or moving end effector 10 for mating, capture, and/or release of object 26.

As used herein, "end effectors" are not limited to end effectors for robots and robot arms, and may be implemented with many different types of systems. For example, end effectors 10 may be configured to be implemented using a robotic device, a transportation device, a stationary robotic arm, a land-based system, a mobile robot, and/or a ship-based system. To that end, support structure 36 may include a ship or other marine vessel (including underwater vessels), an aircraft, a spacecraft, a stationary robot, a mobile robot, a transportation device, a robotic device, a handheld device, and/or a land-based surface or structure. Additionally or alternatively, end effector 10 may include a support element 56, such as support base 38, that supports roller wheels 14, 16, 18, drive system 28, one or more stop structures 54, and/or one or more backstops 57.

End effector 10 is configured to engage with a passive receptacle 44 of object 26 to capture, mate with, and/or release object 26. Passive receptacle 44 may take many different forms in various examples of systems 12. For example, passive receptacle 44 may be a ring-type receptacle that has an annular feature configured to engage with end effector 10, a post-type receptacle that has an elongated post-like member configured to engage with end effector 10, or any other suitable shape for a given example of end effector 10. End effectors 10 may be arranged to interface with or capture a ring or post or other type of passive receptacle of a specific size. For example, end effector 10 may be configured to have an outer perimeter 52 that is sized to engage with an inner diameter of the ring of passive receptacle 44. In some examples, end effector 10 may have a press fit or interference fit with the ring of passive receptacle 44 when the ring is positioned about the centerlines of roller wheels 14, 16, 18. Similarly, end effectors 10 may be configured such that roller wheels 14, 16, 18 are spaced with respect to one another to have an interference fit or press fit with the post or enlarged nub of passive receptacle 44 when the post is captured within interior space 50 between roller wheels 14, 16, 18 and the enlarged nub of the post is at or past the centerlines of the roller wheels. As passive receptacle 44 interfaces with roller wheels 14, 16, 18, the roller wheels are rotated in a direction that pulls passive receptacle 44 onto or into end effector 10 (e.g., pulling a ring of passive receptacle 44 about outer perimeter 52 of roller wheels 14, 16, 18, or by pulling a post of passive receptacle 44 into interior space 50 between roller wheels 14, 16, 18).

With reference to FIG. 2, end effector 10 may be configured to automatically lock passive receptacle 44 in place (thereby capturing object 26) once passive receptacle 44 is grasped and pulled vertically past a first centerline 46 of first roller wheel 14 (e.g., towards support base 38), a second centerline 48 of second roller wheel 16, and/or a third centerline of third roller wheel 18. Centerlines 46, 48 generally correspond to the location of maximum grasping force between roller wheels 14, 16 and passive receptacle 44. In some examples, roller wheels 14, 16, 18 are substantially vertically aligned with one another and substantially equal in diameter, such that the respective centerlines 46, 48 may be substantially co-planar. In some examples, end effector 10 is configured to grasp passive receptacle 44 such that passive receptacle 44 is positioned interiorly to and between first roller wheel 14 and second roller wheel 16, thereby capturing object 26. For example, a post-type passive receptacle 44 may be grasped between roller wheels 14, 16, 18 in an interior area indicated generally at 50. In some examples, end effector 10 is configured to grasp passive receptacle 44 such that passive receptacle 44 is positioned exteriorly about an outer perimeter 52 (FIG. 1) when object 26 is captured, with outer perimeter 52 being defined by the roller wheels and/or a backstop 57 and end effector 10. For example, in end effectors 10 having three roller wheels, outer perimeter 52 may be defined by first roller wheel 14, second roller wheel 16, and third roller wheel 18. In end effectors 10 having two roller wheels and a backstop, outer perimeter 52 may be defined by first roller wheel 14, second roller wheel 16, and backstop 57. In other examples of end effector 10, additional roller wheels may be present that further define outer perimeter 52.

Systems 12 may include one or more stop structures 54 configured to limit movement of object 26 (e.g., passive receptacle 44) with respect to end effector 10. For example, stop structures 54 may be configured to limit vertical translation of passive receptacle 44 with respect to roller wheels 14, 16, 18 by physically substantially preventing further vertical translation of passive receptacle 44 once passive receptacle 44 meets or contacts stop structures 54. Stop structures 54 may be coupled to one or more of roller wheels 14, 16, 18, and/or stop structures 54 may be coupled to or supported by support element 56 (e.g., support base 38). For example, end effectors 10 may include a respective stop structure 54 positioned adjacent each respective roller wheel 14, 16, 18 such that a portion of passive receptacle 44 contacts stop structures 54 once passive receptacle 44 is pulled sufficiently onto end effector 10. In some examples, stop structures 54 may be configured to prevent passive receptacle 44 from being pulled entirely down off of roller wheels 14, 16, 18, such that passive receptacle 44 maintains at least minimal contact with roller wheels 14, 16, 18 when passive receptacle 44 is grasped by end effector 10 and in the locked configuration. In some examples, stop structures 54 may be sized and positioned to ensure that object 26 may be held away from roller wheels 14, 16, 18 when passive receptacle 44 is grasped by roller wheels 14, 16, 18. Additionally or alternatively, stop structures 54 may be coupled to or form a part of passive receptacle 44 of object 26. For example, passive receptacle 44 may include a ring attachment structure, base plate, or other structure that serves as a stop structure 54 by limiting vertical translation of passive receptacle 44 with respect to end effector 10. For example, ring attachment structure, base plate, or other structure of passive receptacle 44 may be configured to contact upper surfaces 128 of roller wheels 14, 16, 18, which may prevent passive receptacle 44 from being pulled further down towards support base 38 by roller wheels 14, 16, 18. In some examples, stop structure 54 may be compliant, including flexible materials and/or spring-loaded elements, to provide a small amount of force toward the roller wheels to help passive receptacle 44 re-engage with the roller wheels 14, 16, 18 for launching.

Some examples of end effectors 10 include backstop 57, which may be positioned to engage with object 26 when object 26 is captured by first roller wheel 14 and second roller wheel 16. In other words, backstop 57 may be substituted for third roller wheel 18, or may simply be a non-rotational structure positioned within end effector 10 to aid in capturing passive receptacles 44 in various examples of systems 12.

Roller wheels 14, 16, 18 may be any suitable roller wheels, including airless tires, pneumatic tires, rubber wheels, belts, and/or solid wheels in various examples of end effector 10. Roller wheels 14, 16, 18 may be rigid, compliant, and/or compressible in various examples of end effector 10. In some examples, all the roller wheels of a given end effector 10 may be the same type, material, size, and density, while in other examples, one or more of the roller wheels 14, 16, 18 may be different from one or more other of roller wheels 14, 16, 18. In some examples, end effectors 10 are configured such that each roller wheel 14, 16, 18 may be selectively removed from end effector 10 and replaced with a replacement roller wheel or different type of roller wheel. In this manner, roller wheels 14, 16, 18 may be selectively replaceable when worn or damaged, and/or different roller wheels may be switched out and used for different objects 26 being captured, mated with, and/or released. Additionally or alternatively, end effectors 10 may be modular, such that end effector 10 is selectively reconfigurable with different numbers of roller wheels 14, 16, 18, multiple drive shaft mounts, and/or structural attachment points.

In some examples, first roller wheel 14, second roller wheel 16, and/or third roller wheel 18 have one or more compliant regions. Additionally or alternatively, the durometer of one or more of the roller wheels 14, 16, 18 may be selected based on the type of passive receptacle 44 of object 26 being captured. For example, roller wheels 14, 16, 18 may be selected to be more rigid for applications involving heavier captures (e.g., heavier passive receptacle 44 and/or objects 26). In some examples, one or more or roller wheels 14, 16, 18 may be pneumatic, with selectively adjustable tire pressures such that it may be increased or decreased as needed for different applications. One or more of roller wheels 14, 16, 18 may be compressible and/or compliant in some examples. Additionally or alternatively, one or more of roller wheels 14, 16, 18 may be airless. These adjustments may be selected based on the weight, mass, and/or materials used in the objects being captured.

In some examples, one or more of roller wheels 14, 16, 18 may include a central groove 58 formed in a perimeter face 60 of the roller wheel 14, 16, 18, which may be configured to improve alignment of object 26 as it is captured or mated with. Additionally or alternatively, perimeter face 60 of one or more roller wheels 14, 16, 18 may include a secondary feature 62 configured to enhance the ability of end effector 10 to capture object 26. For example, secondary feature 62 may include one or more radial grooves and/or a tread pattern.

FIGS. 3-6 schematically illustrate capture and release of an object 26, such as a hovering aircraft, via passive receptacle 44, in the form of a ring receptacle 64. While the object being captured is not illustrated in FIGS. 3-6, it is to be understood that passive receptacle 44 is associated with the object (e.g., coupled to, integrally formed with, etc.) such that the object is effectively captured by end effector 10 when ring receptacle 64 is grasped by roller wheels 14, 16, 18 (only roller wheels 14, 16 are visible in FIGS. 3-6, for clarity). Passive receptacle 44 may be said to be "grasped" by roller wheels 14, 16, 18 when passive receptacle 44 is captured around the outside of the roller wheels, or captured between the roller wheels. Again, two roller wheels 14, 16 are illustrated in FIGS. 3-6 for clarity, though end effectors 10 may include third roller wheel 18 (FIG. 1) and/or additional roller wheels, with one or more roller wheels of end effector 10 being in non-parallel planes with one another. Furthermore, while the simplified, schematic nature of FIGS. 3-6 makes it appear as though roller wheels 14, 16 are rotating in the same plane as one another, it is to be understood that roller wheels 14, 16 may be configured to rotate in non-parallel with one another in various examples of end effectors 10.

Figure 3:
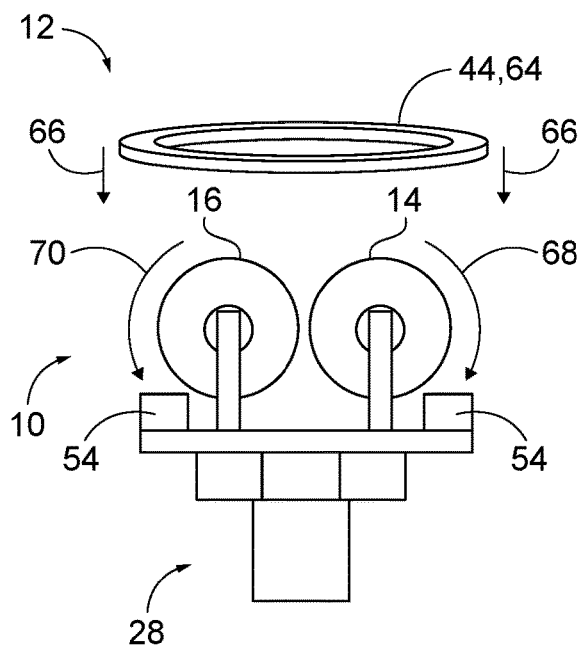
FIG. 3 is a side elevation schematic representation of a passive receptacle approaching an end effector according to the present disclosure.
Figure 4:
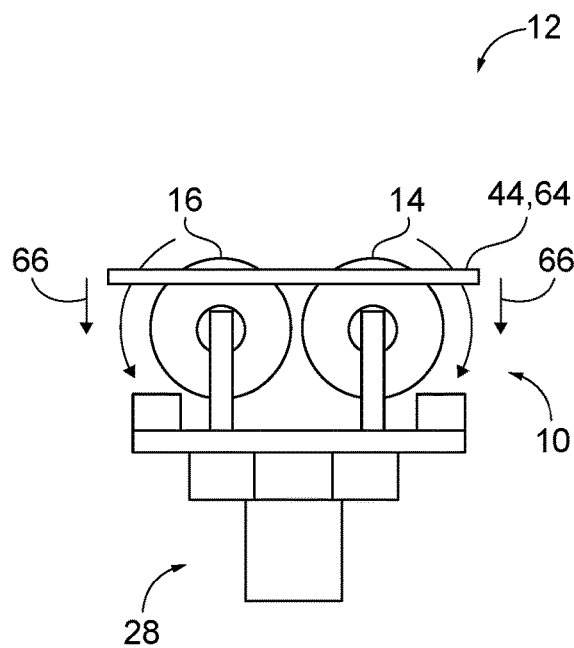
FIG. 4 is a side elevation schematic representation of a passive receptacle in the process of being captured by an end effector according to the present disclosure.

In the example of FIGS. 3-6, the object approaches end effector 10 with passive receptacle 44 oriented towards roller wheels 14, 16 as shown in FIG. 3, with passive receptacle 44 moving generally towards end effector 10, in the direction indicated by arrows 66. First roller wheel 14 is rotated in a first direction (indicated by arrow 68) and second roller wheel 16 is rotated in a second direction (indicated by arrow 70) while the object is captured. As shown in FIG. 4, once passive receptacle 44 contacts roller wheels 14, 16, the roller wheels begin to pull on passive receptacle 44, such that passive receptacle 44 is pulled further in the direction indicated by arrows 66. As shown, passive receptacle 44 engages with the outer edges of roller wheels 14, 16 (e.g., about outer perimeter 52 around roller wheels 14, 16, 18; see FIG. 1) as it is grasped by end effector 10. Passive receptacle 44 is effectively locked onto roller wheels 14, 16 once passive receptacle 44 is pulled down past centerlines 46, 48 (FIG. 5) of roller wheels 14, 16. Again, while a third roller wheel is not visible in the schematic representations of FIGS. 3-6, it is to be understood that passive receptacle 44 may be effectively locked onto one or more additional roller wheels beyond the illustrated roller wheels 14, 16, such as being locked onto three roller wheels 14, 16, 18 (FIG. 1).

Stop structures 54 serve as a stop to prevent ring receptacle 64 from being pulled further down, and may ensure that passive receptacle 44 remains in contact with roller wheels 14, 16 and/or any additional roller wheels of end effector 10. In some examples, stop structures 54 may be compliant so as to provide a cushion for passive receptacle 44 as it is pressed into stop structures 54 during capture of the object. At this point, the motor or motors of drive system 28 may be turned off, if desired (or may be automatically turned off via a limit switch), though in some examples, the motor or motors may continue to run in the retraction/capture direction without stalling drive system 28, because end effectors 10 may be configured to only be applying a small amount of retraction force on passive receptacle 44 when passive receptacle 44 is in the locked position (e.g., contacting stop structures 54 and/or pulled down past centerlines 46, 48 of roller wheels 14, 16). In other words, in some examples, the roller wheels do not need to be stopped once object 26 is captured, because end effectors 10 and systems 12 may be configured to allow for continued rotation of the roller wheels after capture, without damaging object 26 or passive receptacle 44.

Figure 5:
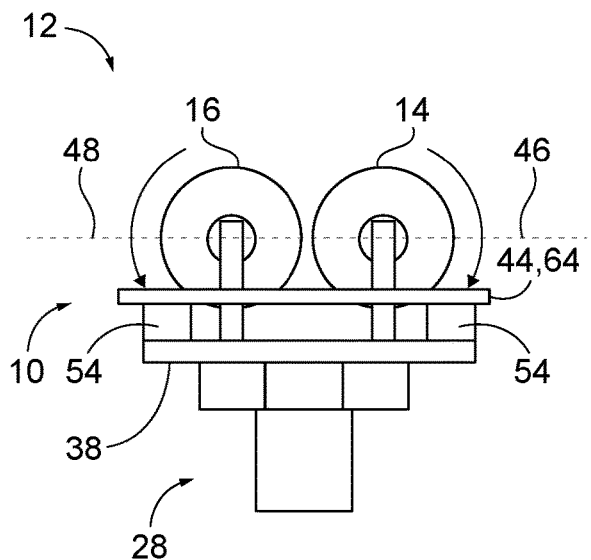
FIG. 5 is a side elevation schematic representation of a passive receptacle effectively locked into place on an end effector, having been captured by the same.
Figure 6:
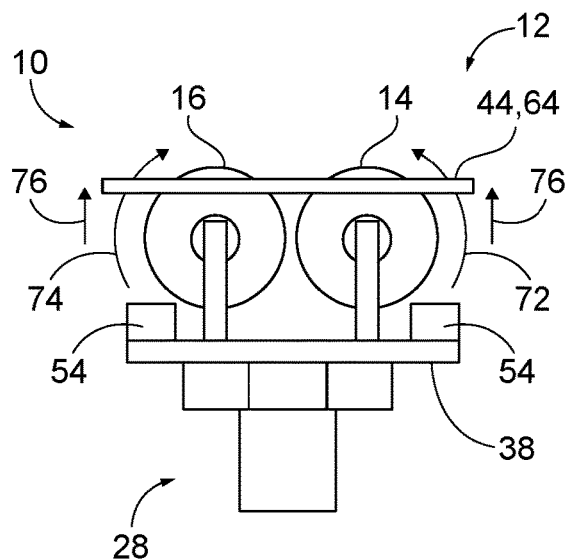
FIG. 6 is a side elevation schematic representation of a passive receptacle in the process of being launched or released from an end effector according to the present disclosure.

FIGS. 3-5 may be said to represent end effector 10 in a capture configuration, while FIG. 6 represents end effector 10 in a release, or launch, configuration. The roller wheels of end effector 10 may be driven such that the rotate inwardly in one configuration, and outwardly in the other configuration. For example, as shown in FIG. 6, to selectively release the object from end effector 10, drive system 28 reverses the direction of rotation of roller wheels 14, 16 (and any additional roller wheels of end effector 10). Namely, first roller wheel 14 is reversed in FIG. 6 such that it rotates in the opposite direction from during the capture sequence of FIGS. 3-5, as indicated by arrow 72, and second roller wheel 16 is reversed such that it also rotates in the opposite direction from during the capture sequence, as indicated by arrow 74. As a result, roller wheels 14, 16, will grab the edges of passive receptacle 44 and push it away from stop structures 54 such that passive receptacle 44 lifts off of stop structures 54 and away from support base 38, in the direction indicated by arrows 76. In this manner, passive receptacle 44 begins to be pushed off of roller wheels 14, 16, until passive receptacle 44 is entirely free from roller wheels 14, 16 (e.g., it is propelled off the top of roller wheels 14, 16 and any other roller wheels of end effector 10), thereby effectuating release of the object from end effector 10.

Because systems 12 and end effectors 10 may be configured to retain object 26 in a captured, or locked, configuration via passive receptacle 44 until the direction of rotation of the roller wheels is reversed for launch/release, this may enable UAV motors of object 26 to be started to prepare for takeoff, as end effectors 10 may be configured to prevent release of object 26 until the roller wheels (e.g., roller wheels 14, 16, 18) are reversed to push passive receptacle 44 away from end effector 10. While systems 12 are described herein as capturing and releasing passive receptacle 44 by translating it in the substantially vertical direction, other examples of systems 12 and end effectors 10 may be configured to capture and release objects 26 that are moved towards end effector 10 horizontally or at other orientations relative to end effector 10. Similarly, end effectors 10 may be supported and positioned to release or launch objects 26 horizontally or at other angles/orientations in various implementations.

Advantageously, systems 12 are configured to be tolerant of positional and rotational misalignment between passive receptacle 44 and end effector 10 in any direction. In other words, presently disclosed end effectors 10 are configured to capture objects 26 via passive receptacles 44 even when conditions, tolerances, or other errors prevent correct alignment between passive receptacle 44 and end effector 10. For example, in windy conditions when object 26 and/or end effector 10 may be moving around unpredictably, presently disclosed end effectors 10 may be configured to capture or mate with the object despite these difficulties, due to the system's tolerance for positional and rotational misalignment provided by the orientation and arrangement of the roller wheels with respect to one another. End effectors 10 may be configured to handle approaching objects from any angle, allowing for a full 360 degree range of heading angles, thus being tolerant of misalignment in any direction. While prior art systems may be able to tolerate misalignment in a single direction, they are not capable of capturing objects from a full 360 degree range of heading angles.

Figures 7, 8:
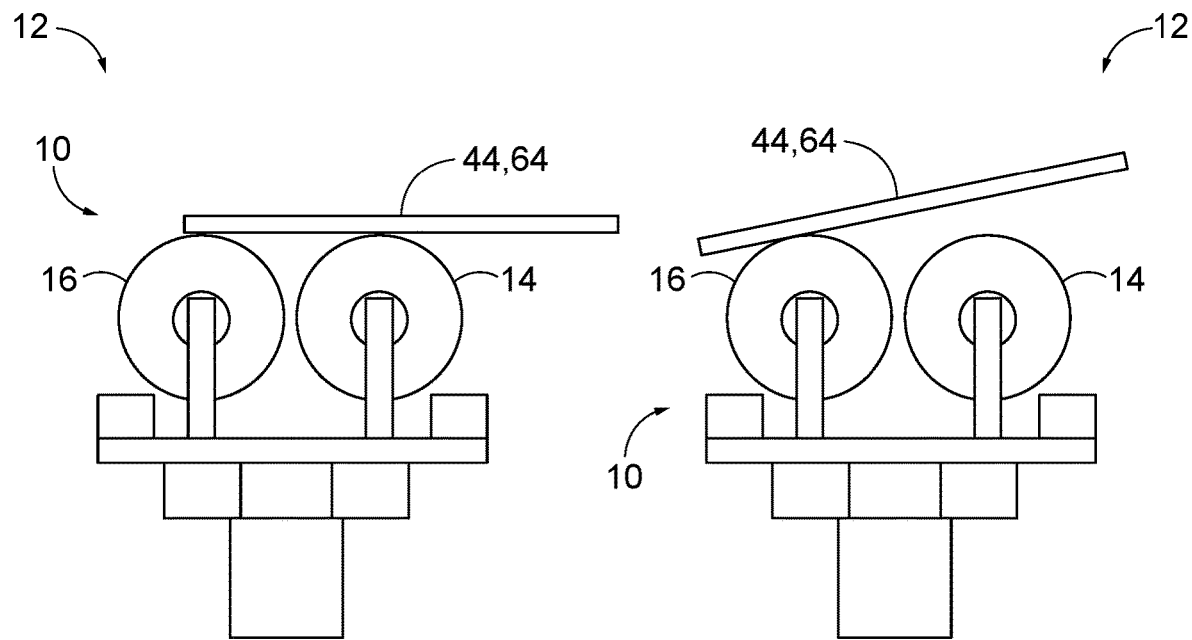
FIG. 7 is a side elevation schematic representation of a passive receptacle in positional misalignment with respect to an end effector.
FIG. 8 is a side elevation schematic representation of a passive receptacle in rotational misalignment with respect to an end effector.

To illustrate, FIGS. 3-4 schematically show a substantially ideal alignment between passive receptacle 44 and roller wheels 14, 16, with passive receptacle 44 approaching end effector 10 such that passive receptacle 44 is centered over roller wheels 14, 16. On the other hand, FIG. 7 illustrates an example where passive receptacle 44 is positionally misaligned from roller wheels 14, 16, in that passive receptacle 44 is off-center from roller wheels 14, 16 when passive receptacle 44 has contacted roller wheels 14, 16. Nonetheless, end effectors 10 are still configured to capture the object via passive receptacle 44 even when it is off-center, because the rotation of roller wheels 14, 16 will serve to pull passive receptacle 44 over and onto all the roller wheels of end effector 10. Similarly, FIG. 8 illustrates an example where passive receptacle 44 is rotationally misaligned from roller wheels 14, 16, in that passive receptacle 44 is not level with the tops of roller wheels 14, 16, but is angled such that passive receptacle 44 contacts second roller wheel 16, but not first roller wheel 14, when passive receptacle 44 first contacts end effector 10. Nonetheless, end effectors 10 are still configured to capture the object via passive receptacle 44 even when it is rotationally misaligned, because rotation of second roller wheel 16 will serve to pull passive receptacle 44 down into contact with first roller wheel 14 as well. End effectors 10 may be configured to capture objects 26 experiencing both positional misalignment (FIG. 7) and rotational misalignment (FIG. 8), due to the arrangement and orientation of the roller wheels.

Figure 9:
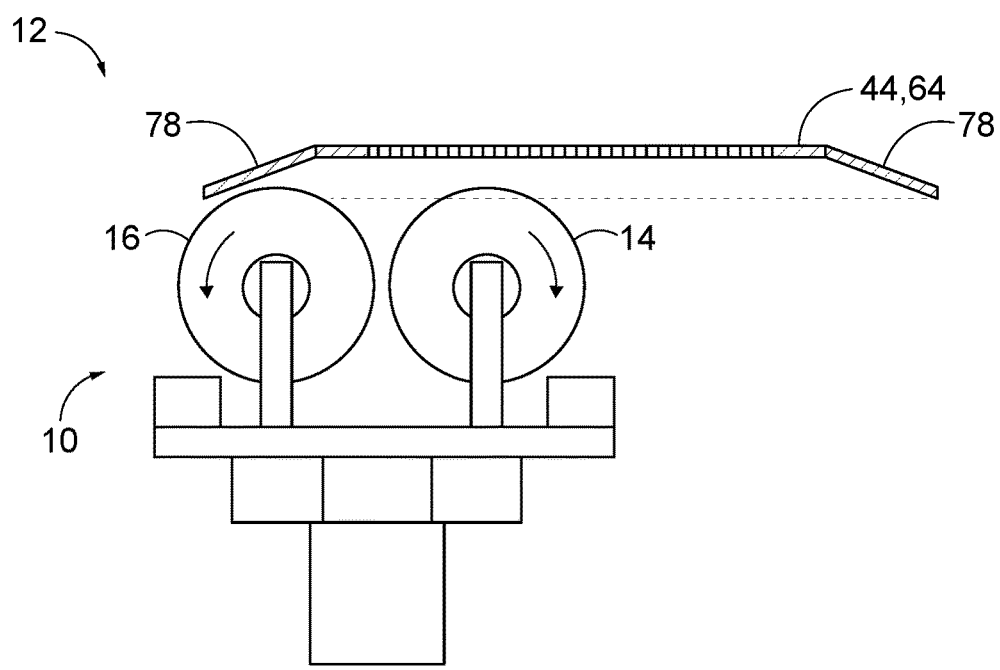
FIG. 9 is a side elevation schematic representation of a passive receptacle in positional misalignment with respect to an end effector.

FIG. 9 illustrates a variation of passive receptacle 44 which includes tapered edge guides 78, which also may be referred to as a skirt 78, around an outer perimeter of passive receptacle 44. As shown in FIG. 9, tapered edge guide 78 may facilitate, or aid, in correcting the alignment of passive receptacle 44 with respect to the roller wheels (roller wheels 14 and 16 are shown in FIG. 9, though end effector 10 may include one or more additional roller wheels, such as roller wheel 18) when tapered edge guide 78 contacts one or more of the roller wheels. Thus, tapered edge guide 78 may be configured to facilitate capture of the object by end effector 10 even when only one roller wheel (e.g., when only roller 14, or only roller wheel 16) contacts passive receptacle 44.

Figure 10:
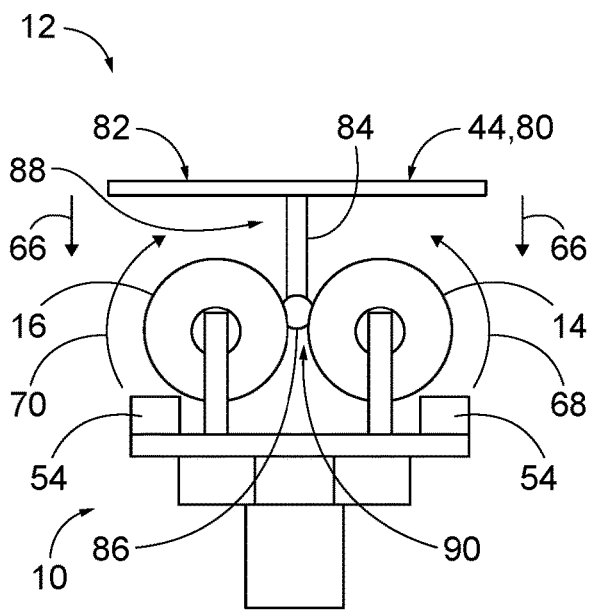
FIG. 10 is a side elevation schematic representation of a passive receptacle in the process of being captured by an end effector according to the present disclosure.
Figure 11:
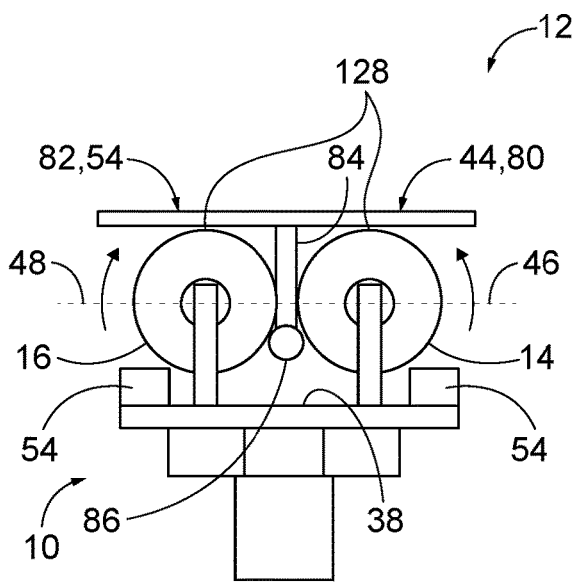
FIG. 11 is a side elevation schematic representation of a passive receptacle effectively locked into place on an end effector, having been captured by the same.
Figure 12:
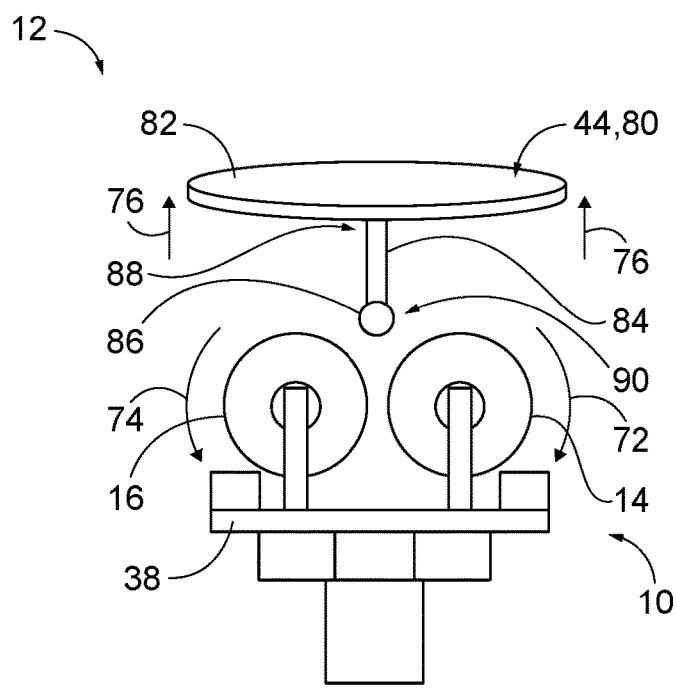
FIG. 12 is a side elevation schematic representation of a launch of a passive receptacle from an end effector according to the present disclosure.

FIGS. 10-12 illustrate another example of system 12, in which end effector 10 is configured to capture an object 26 via passive receptacle 44 in the form of a post receptacle 80. Post receptacle 80 may include a base plate 82, from which an elongated post, or peg, 84 extends from a proximal end region 88 to a distal end region 90. Post 84 is coupled to (or formed integrally with) base plate 82 at or within proximal end region 88 of post 84. Post 84 includes an enlarged nub 86 at or within distal end region 90 of post 84. As with FIGS. 3-6, the object being captured is not illustrated in FIGS. 10-12 (for clarity), though it is to be understood that passive receptacle 44 is associated with the object (e.g., coupled to, integrally formed with, etc.) such that the object is effectively captured by end effector 10 when post receptacle 80 is grasped by the roller wheels (e.g., roller wheels 14, 16, 18). Similarly, while only two roller wheels 14, 16 are visible in FIGS. 10-12 for clarity, such end effectors 10 may include one or more additional roller wheels (e.g., roller wheels 14,1 6, 18), with one or more of the roller wheels rotating in a different plane than one or more other of the roller wheels.

While ring receptacle 64 is grasped by the outer edges of the roller wheels in the example of FIGS. 3-6, post receptacle 80 of FIGS. 10-12 is grasped by the inner edges of the roller wheels. In other words, post receptacle 80 is positioned between the roller wheels when post receptacle 80 is grasped by end effector 10, such as within interior space 50 between roller wheels 14, 16, 18 (FIG. 1). Specifically, as shown in FIG. 10, the object having post receptacle 80 approaches end effector 10 such that enlarged nub 86 contacts one or more of roller wheels 14, 16 (and/or roller wheel 18, which is not visible in FIGS. 10-12). During capture of the object, first roller wheel 14 is rotated in a first direction (indicated by arrow 68) and second roller wheel 16 is rotated in a second direction (indicated by arrow 70). The rotation of roller wheels 14, 16 pulls post receptacle 80 down towards support base 38, such that post receptacle 80 continues to move in the direction indicated by arrows 66. It is to be understood that any additional roller wheels of end effector 10 may be rotated accordingly, in coordination and cooperation with roller wheels 14, 16, to engage post receptacle 80 and pull it between the roller wheels to capture the object.

As shown in FIG. 11, when the object is captured by end effector 10, enlarged nub 86 may be drawn past the centerlines of the roller wheels such that post 84 may be positioned interiorly between the roller wheels. For example, FIG. 11 shows enlarged nub 86 having been pulled down past centerlines 46, 48 of roller wheels 14, 16, and post 84 being positioned interiorly between roller wheels 14, 16, though it is to be understood that enlarged nub 86 is also pulled down past other respective centerlines of other roller wheels that may be included in end effector 10, and post 84 may be positioned interiorly between all the roller wheels as well. The centerlines of the roller wheels (e.g., centerlines 46, 48) may effectively serve as a pinch point for enlarged nub 86 as it is pulled into end effector 10 or launched away from end effector 10 after being captured. In some examples, base plate 82 of post receptacle 80 may serve as a stop structure 54 because base plate 82 may engage with, or contact, the upper surfaces 128 of roller wheels 14, 16 once post receptacle 80 is grasped by end effector 10, thereby preventing further movement of post receptacle 80 towards support base 38 of end effector 10. As shown in FIG. 12, to selectively release the object, the directions of rotation of roller wheels 14, 16 (and any additional roller wheels) are selectively reversed. Thus, first roller wheel 14 is rotated in the opposite direction from which it was rotated during the capture sequence, as indicated by arrow 72, and second roller wheel 16 is rotated in the opposite direction from which it was rotated during the capture sequence, as indicated by arrow 74. As a result, the roller wheels push post 84 away from support base 38, in the direction indicated by arrows 76, and thereby push enlarged nub 86 past the centerlines of the roller wheels (e.g., past centerlines 46, 48 of roller wheels 14, 16, which are labeled in FIG. 11). In this manner, post receptacle 80 (and thereby the associated object) is released from end effector 10.

Figure 13:
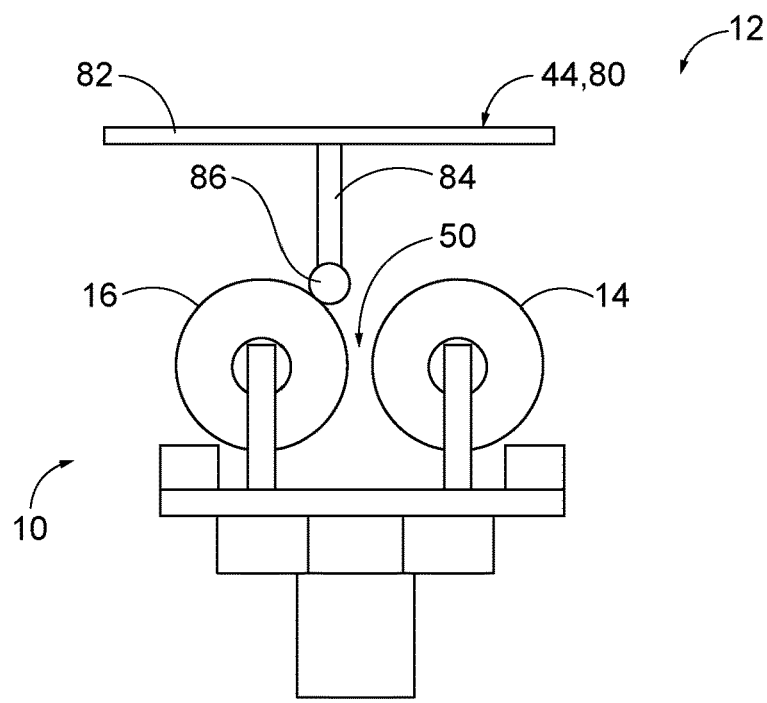
FIG. 13 is a side elevation schematic representation of a passive receptacle in positional misalignment with respect to an end effector.
Figure 14:
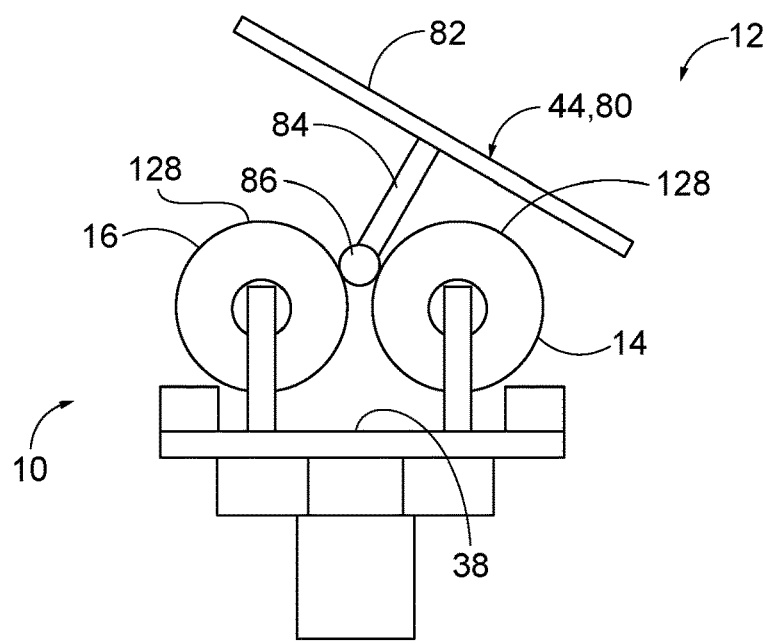
FIG. 14 is a side elevation schematic representation of a passive receptacle in rotational misalignment with respect to an end effector.

Again, systems 12 are configured to be tolerant of positional and rotational misalignment between passive receptacle 44 and end effector 10, which is illustrated in FIGS. 13-14 using an example of post receptacle 80. While FIGS. 10-11 illustrate substantially ideal alignment between passive receptacle 44 and roller wheels 14, 16, with passive receptacle 44 approaching end effector 10 such that passive receptacle 44 is centered over roller wheels 14, 16. FIGS. 13-14 illustrate examples of misalignment between post receptacle 80 and roller wheels 14, 16. In FIG. 13, post receptacle 80 is positionally misaligned from roller wheels 14, 16, in that passive receptacle 44 is off-center from the space between roller wheels 14, 16 to the extent that enlarged nub 86 has contacted second roller wheel 16 but not first roller wheel 14. Nonetheless, end effectors 10 are still configured to capture the object via post receptacle 80 even when it is off-centered, because the rotation of roller wheels 14, 16 will serve to pull enlarged nub 86 and post 84 between the roller wheels of end effector 10 (e.g., towards and into interior space 50) due to rotation of roller wheels 14, 16 and the resulting forces applied to enlarged nub 86 and post 84.

Similarly, FIG. 14 illustrates an example where post receptacle 80 is rotationally misaligned from roller wheels 14, 16, in that base plate 82 is not level with upper surfaces 128 of roller wheels 14, 16, but is angled such that one end of base plate 82 is closer to one of roller wheels 14, 16 than another of the roller wheels is to the other end of base plate 82 (e.g., base plate 82 is angled to be closer to roller wheel 14 than to roller 16, in the illustrated example). Nonetheless, end effector 10 is still configured to capture the object via post receptacle 80 even when it is rotationally misaligned, because rotation of second roller wheel 16 will serve to pull enlarged nub 86 and post 84 towards support base 38, which will level base plate 82 of post receptacle 80 in the process. End effector 10 may thus be configured to capture objects 26 experiencing both positional misalignment (FIG. 13) and rotational misalignment (FIG. 14), due to the arrangement and orientation of the roller wheels as described herein.

Turning now to FIGS. 15-17 and 20-25, illustrative, non-exclusive examples of systems 12, end effectors 10, and/or components thereof are presented. Where appropriate, the reference numerals from the schematic illustrations of FIGS. 1-14 (or FIGS. 18-19 and 26-30) are used to designate corresponding parts in FIGS. 15-17 and 20-25; however, the examples of FIGS. 15-17 and 20-25 are non-exclusive and do not limit systems 12 or end effectors 10 to the illustrated examples of FIGS. 15-17 and 20-25. That is, end effectors 10 and systems 12 are not limited to the specific examples illustrated in FIGS. 15-17 and 20-25 and may incorporate any number of the various aspects, configurations, characteristics, properties, etc. that are illustrated in and discussed with reference to the schematic representations of FIG. 1-14, 18-19, or 26-30, and/or the examples of FIGS. 15-17 and 20-25, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 15-17 and 20-25; however, it is within the scope of the present disclosure that the previously discussed features, variants, etc. may be utilized therewith.

Figure 15:
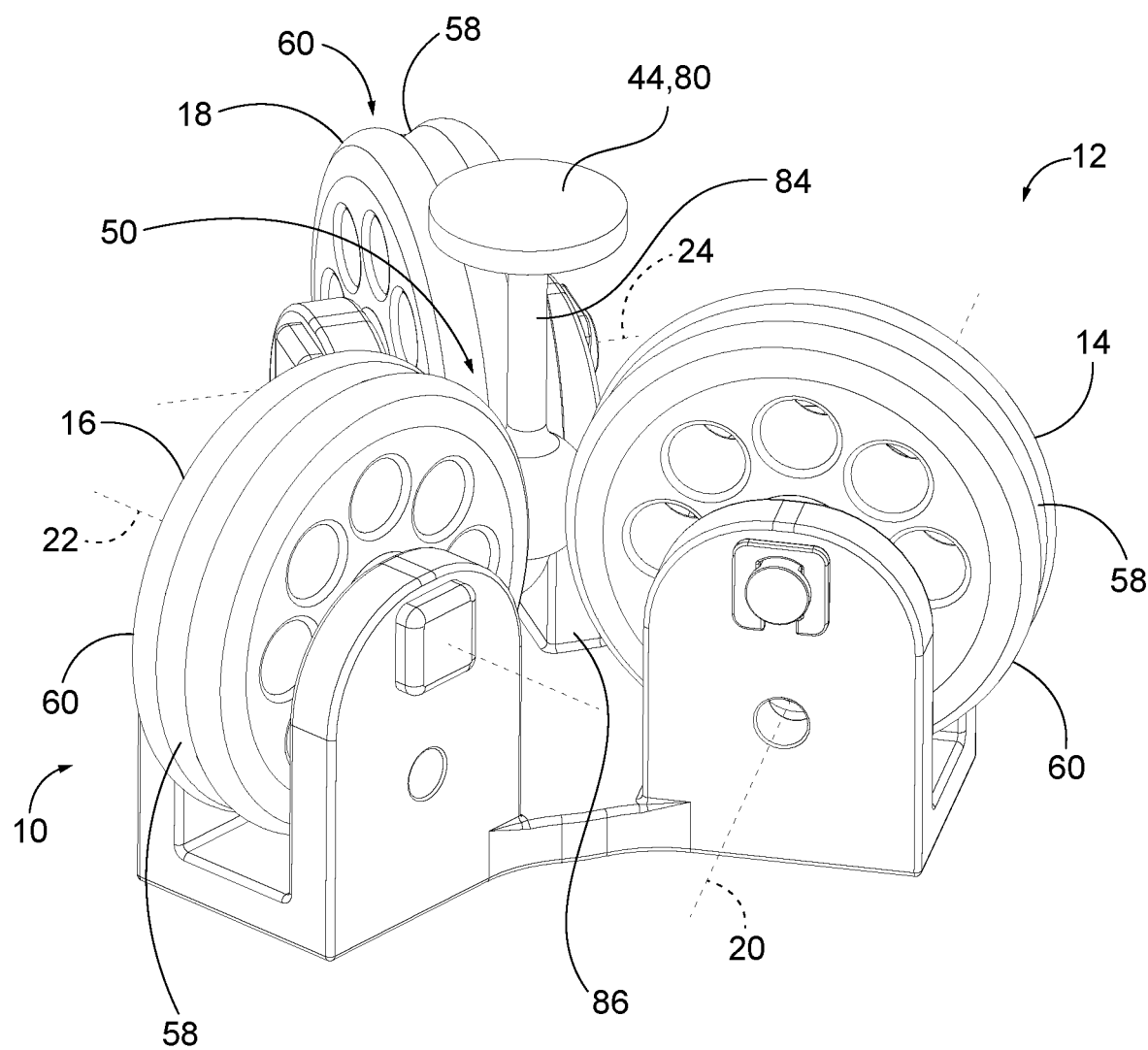
FIG. 15 is perspective view of an example of an end effector according to the present disclosure, with a post-type passive receptacle captured thereby.

FIG. 15 is a perspective view of an example of end effector 10 with three roller wheels, 14, 16, 18. As shown, in this example, roller wheels 14, 16, 18 are all arranged to rotate in different planes that are at non-parallel and non-perpendicular angles with respect to one another. First roller wheel 14 rotates about first axis 20, second roller wheel 16 rotates about second axis 22, and third roller wheel 18 rotates about third axis 24, with each of first axis 20, second axis 22, and third axis 24 being non-parallel and non-perpendicular to one another. In this example, a passive receptacle 44 in the form of a post receptacle 80 is shown captured, or grasped, within interior space 50 between roller wheels 14, 16, 18 (though object 26 is not shown in FIG. 15 for clarity). As shown in FIG. 15, one or more of roller wheels 14, 16, 18 may have a central groove 58 formed in perimeter face 60 of each roller wheel 14, 16, 18. When post receptacle 80 is captured by end effector 10, enlarged nub 86 may be positioned at least partially within the central grooves 58 of roller wheels 14, 16, 18. In other words, central grooves 58 may be sized and shaped to facilitate engagement with enlarged nub 86 and/or post 84 of post receptacle 80.

Figure 16:
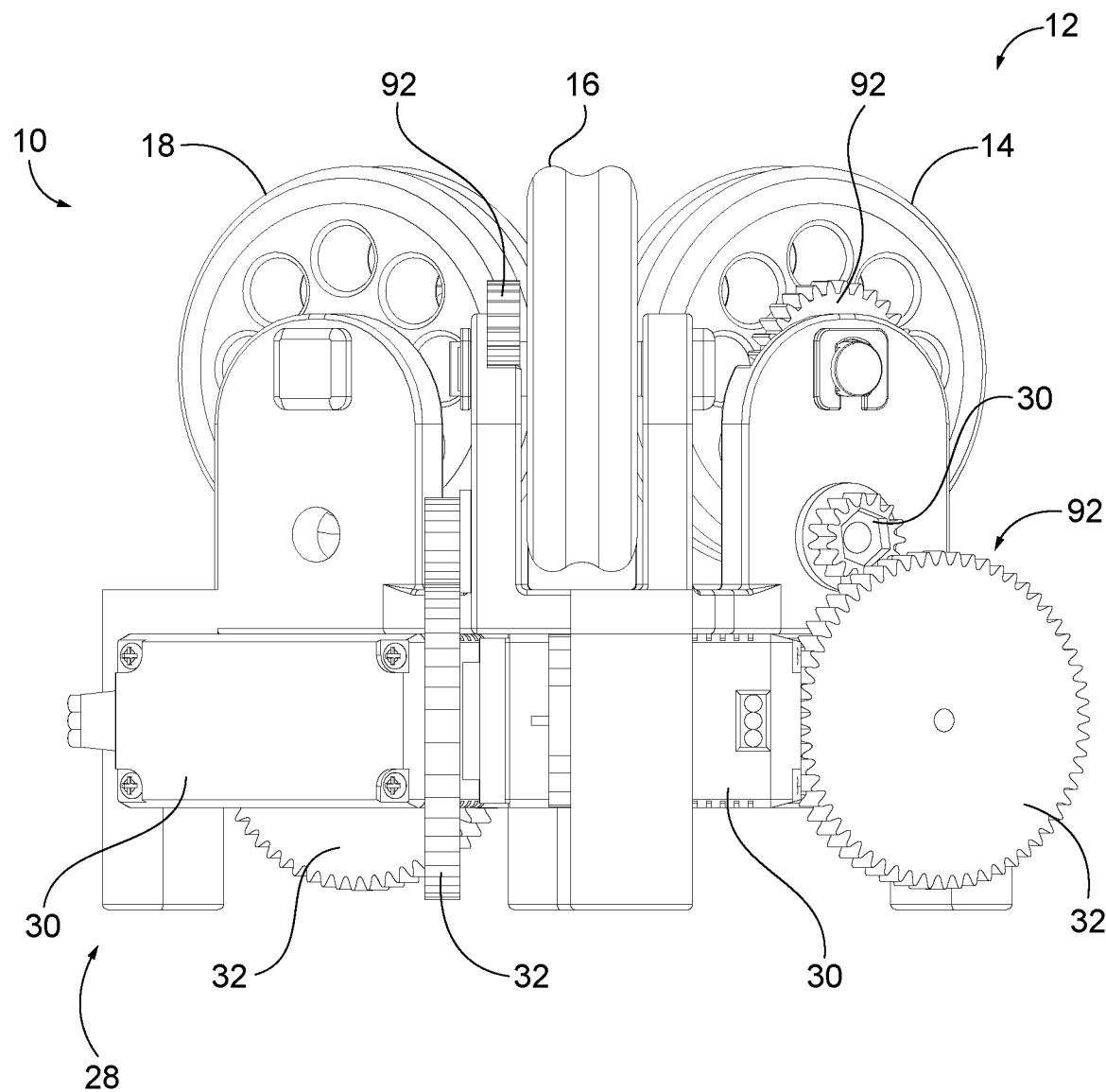
FIG. 16 is a side elevation view of an example of an end effector according to the present disclosure, having individual motors for each respective roller wheel of the end effector.

Systems 12 generally include drive systems 28 to power roller wheels 14, 16, 18 of end effectors 10. FIG. 16 illustrates an example of drive system 28 that includes a respective motor 30 for each respective roller wheel 14, 16, 18. A respective drive gear 32 operatively coupled to each respective motor 30 transfers rotational energy from each respective motor 30 to the respective roller wheel 14, 16, 18. Drive system 28 may include one or more additional respective gears 92 operatively coupled to each drive gear 32 as desired for a particular layout of end effector 10.

Figure 17:
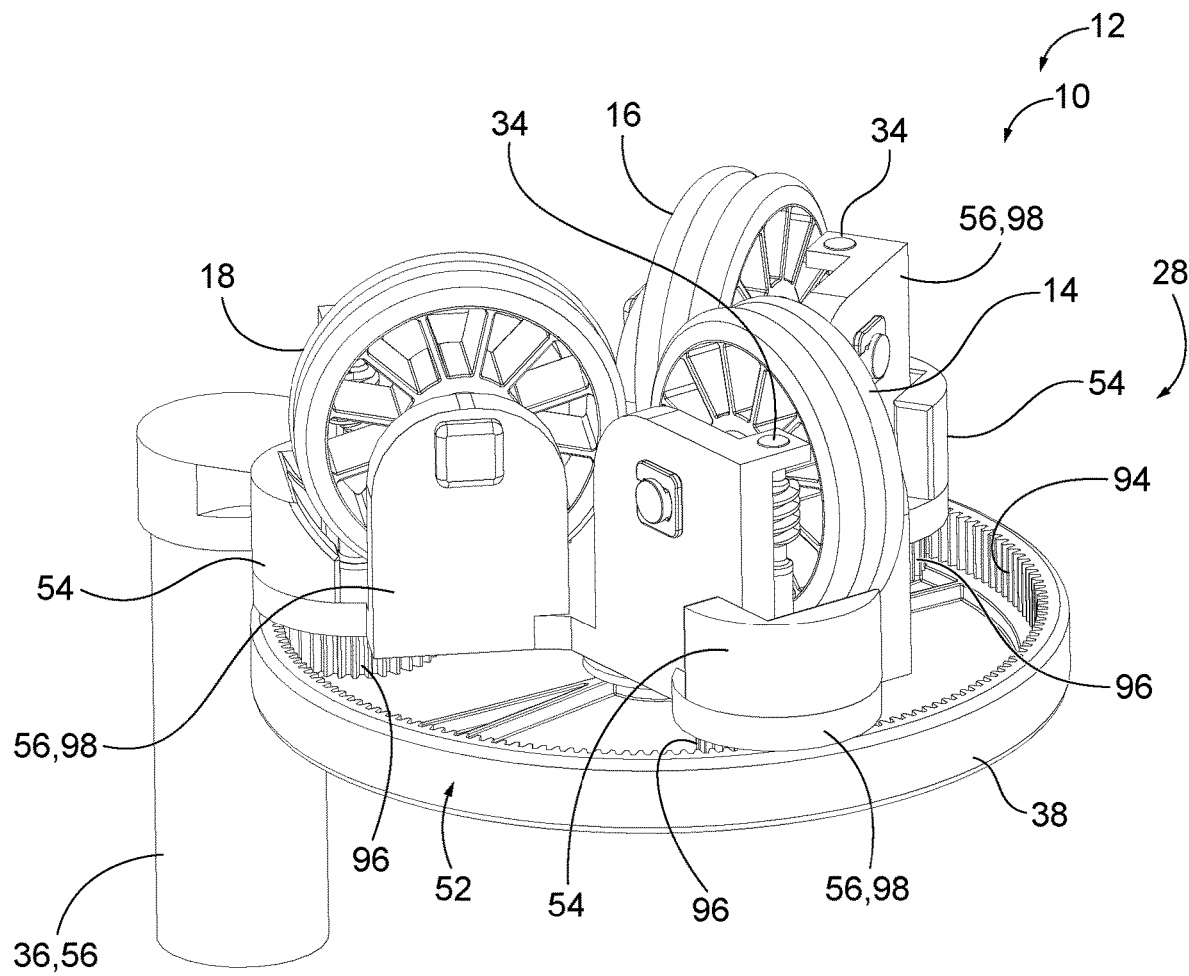
FIG. 17 is a perspective view of an example of an end effector according to the present disclosure, having a single drive motor configured to drive the three roller wheels of the end effector.

While the example of FIG. 16 includes a respective drive motor 30 for each respective roller wheel 14, 16, 18, the drive system 28 in the example of FIG. 17 includes just a single motor 30 that drives all of roller wheels 14, 16, 18. In other examples, a respective motor 30 may be configured to drive a subset of the roller wheels in a given end effector 10, while the other roller wheels may be driven by one or more other respective motors 30. In the example of FIG. 17, support base 38 supports an external control gear ring 94 (which also may be referred to as an annular gear 94) positioned within or adjacent outer perimeter 52 of support base 38, and a plurality of radially spaced spur gears 96. A single motor 30 (not shown in FIG. 17, for clarity) may be configured to drive external control gear ring 94, which in turn is configured to rotate the plurality of spur gears 96 (e.g., external control gear ring 94 may be engaged with, or meshed with, spur gears 96). For example, there may be a respective spur gear 96 for each respective roller wheel 14, 16, 18, as in the example of FIG. 17. Each respective spur gear 96 may be operatively coupled to a respective drive shaft 34 of a respective roller wheel 14, 16, 18 (e.g., via a worm screw and worm gear, or via beveled gears) to drive the respective roller wheel such that rotation of each respective spur gear 96 causes rotation of the respective drive shaft 34 to which the respective spur gear 96 is coupled (e.g., positioned on). In this manner, rotation of external control gear ring 94 by a single motor 30 may effectuate rotation of all of roller wheels 14, 16, 18.

In the example of FIG. 17, support element 56 includes a housing 98 that positions and aligns roller wheels 14, 16, 18 with respect to one another. Housing 98 also supports stop structures 54 in this example, with this example of end effector 10 including a respective stop structure 54 for each respective roller wheel 14, 16, 18. Housing 98 may be coupled to or engaged with support base 38. Additionally or alternatively, housing 98 may be coupled to or engaged with support structure 36, such as a handle or robot arm.

Figure 19:
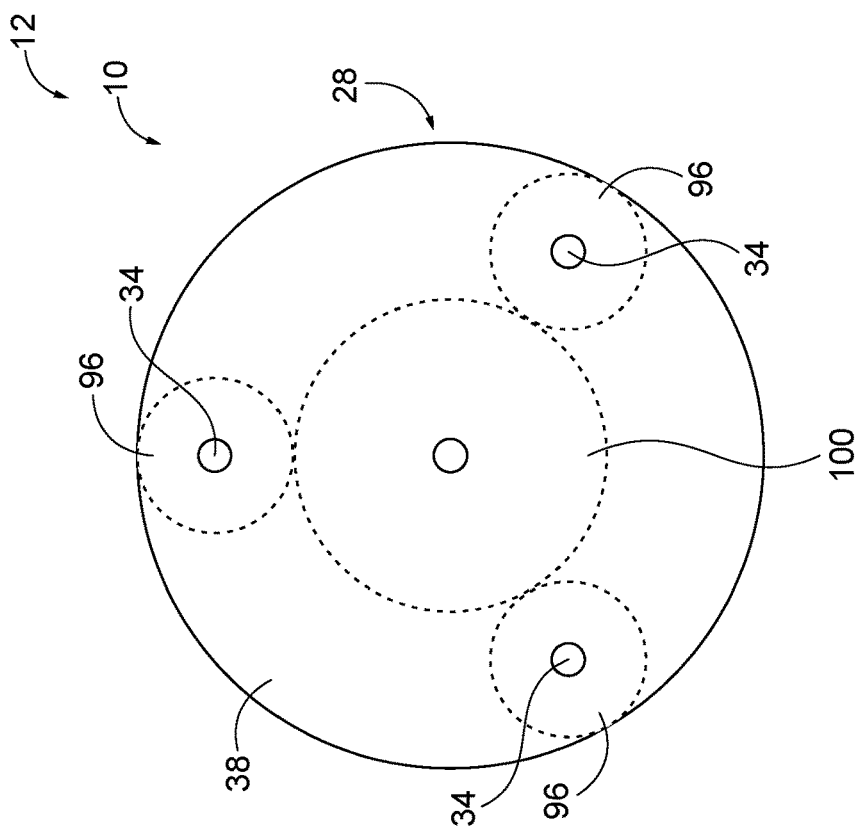
FIG. 19 is a top plan schematic representation of an internal drive gear variation of presently disclosed end effectors, having a central control gear and a plurality of radially spaced spur gears configured to drive the roller wheels.
Figure 18:
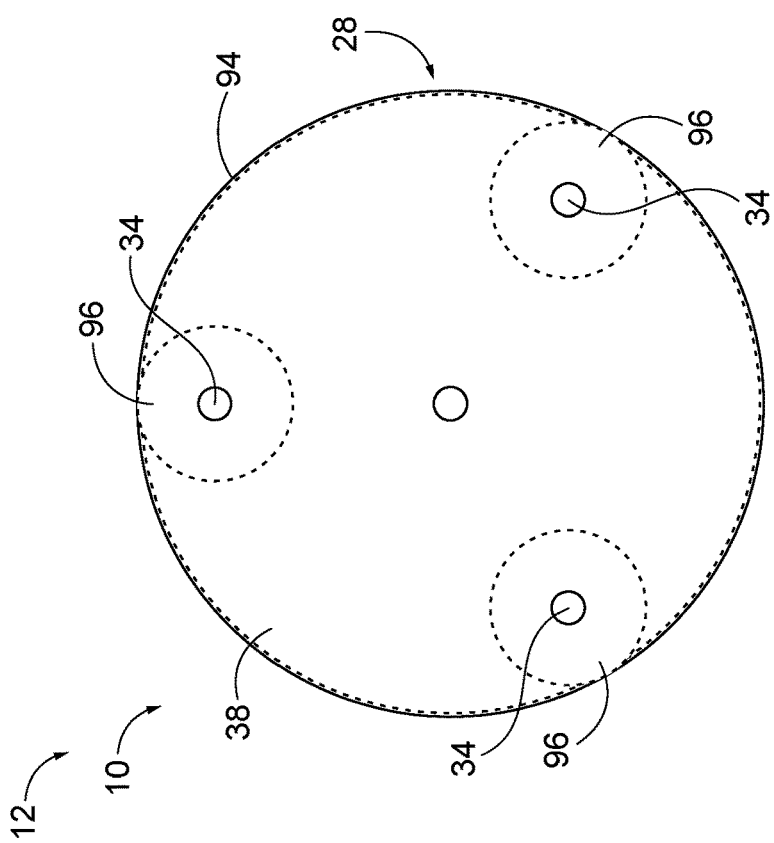
FIG. 18 is a top plan schematic representation of an external drive gear variation of presently disclosed end effectors, having an external control gear ring and a plurality of radially spaced spur gears configured to drive the roller wheels.

An example of a drive system 28 similar to the implementation illustrated in FIG. 17 is schematically represented in FIG. 18, which shows a top plan schematic representation of external control gear ring 94 engaged with three spur gears 96, with each respective spur gear 96 being configured to drive a respective roller wheel via a respective drive shaft 34, such as using a respective worm screw and worm gear, or bevel gears to transfer power from each respective spur gear 96 to the corresponding respective drive shaft 34. Other examples of drive system 28 are schematically represented in FIG. 19, which shows a central control gear 100 engaged with a plurality of radially spaced spur gears 96, with central control gear 100 being configured to rotate the plurality of radially spaced spur gears 96. Again, each respective spur gear 96 may be configured to drive a respective roller wheel 14, 16, 18 via a respective drive shaft 34. Central control gear 100 may be positioned centrally between the plurality of radially spaced spur gears 96. While illustrated examples show spur gears 96, other examples of end effectors 10 may have different drive systems 28 using different types of gear sets, such as herringbone gear sets, helical gear sets, or double helical gear sets.

Figure 21:
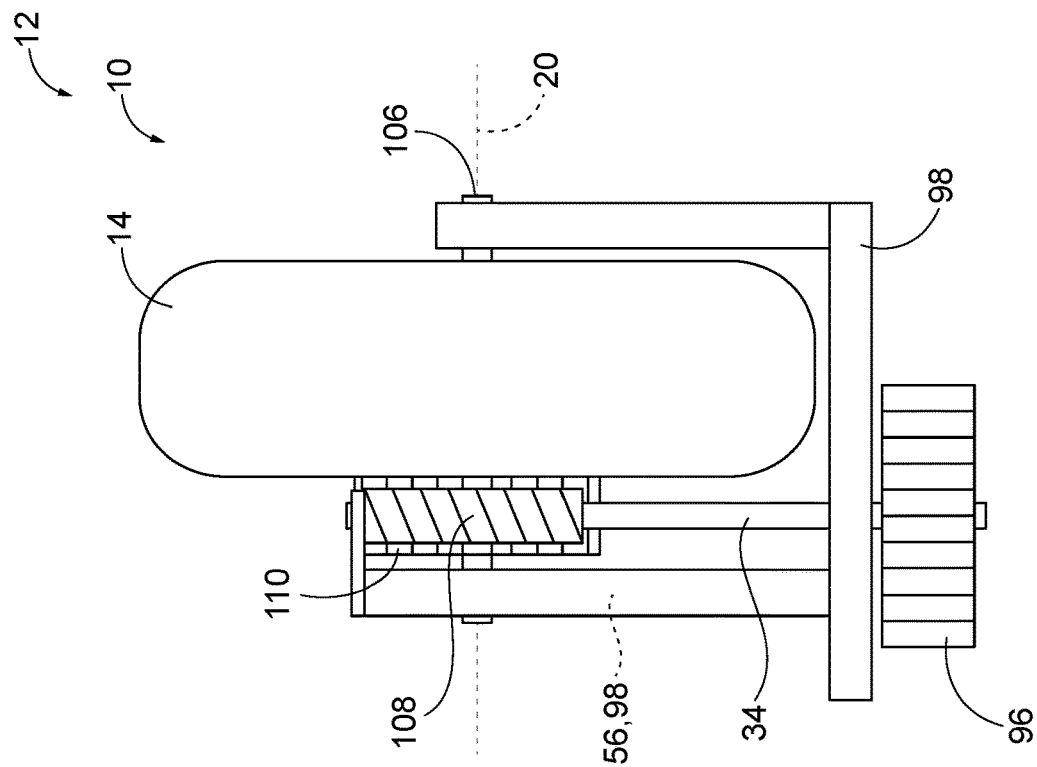
FIG. 21 is a side elevation view of a portion of an example of presently disclosed end effectors, showing a worm gear implementation for driving a roller wheel.
Figure 20:
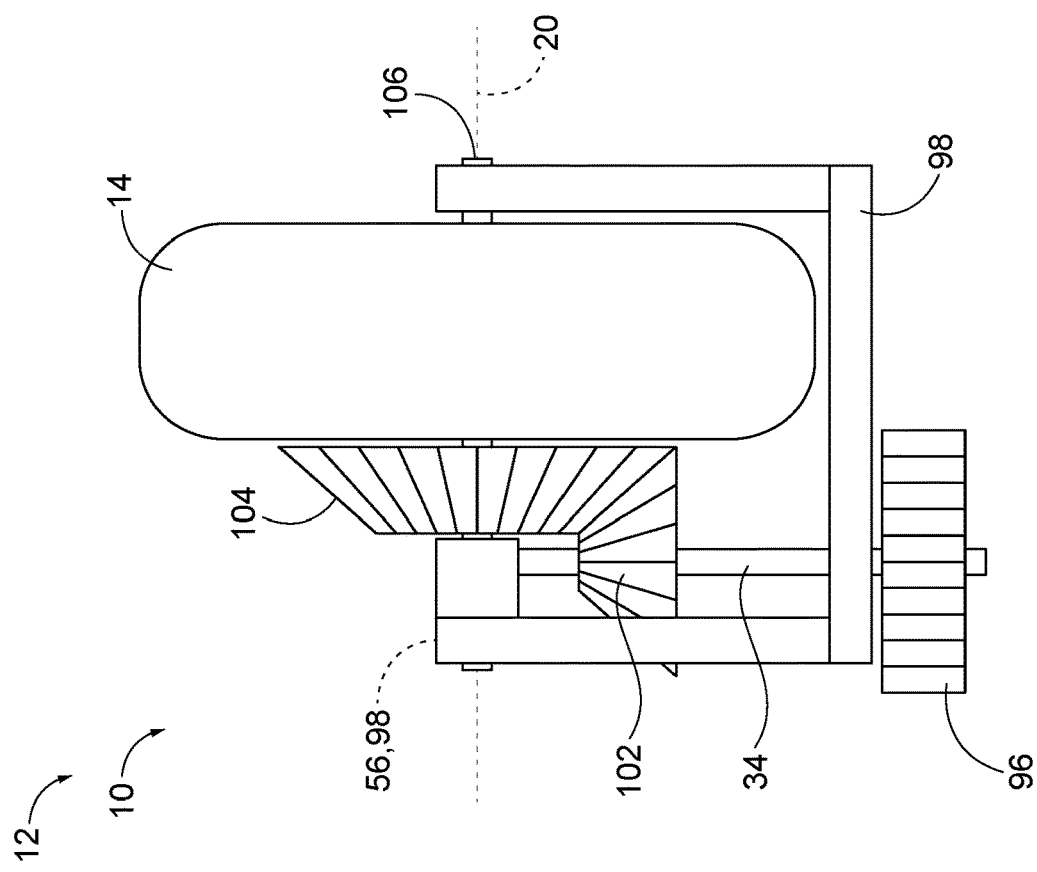
FIG. 20 is a side elevation view of a portion of an example of presently disclosed end effectors, showing a bevel gear implementation for driving a roller wheel.

Regardless of whether an external control gear ring 94 or a central control gear 100 is used (or a different gearing arrangement altogether), end effectors 10 may include additional gears configured to rotate roller wheels 14, 16, 18 and transfer energy from the motors and spur gears 96 to each roller wheel 14, 16, 18 via drive shafts 34. FIGS. 20-21 illustrate two examples of such additional gears to implement presently disclosed end effectors 10, though end effectors 10 are not limited to these particular examples. A single roller wheel 14 is shown in each of FIGS. 20-21, for simplicity, though those of ordinary skill in the art will appreciate that the illustrated arrangements can be used for the other roller wheels of end effector 10 that are not illustrated in FIGS. 20-21. In the example of FIG. 20, spur gear 96 drives drive shaft 34, which in turn rotates a first bevel gear 102 coupled to drive shaft 34. First bevel gear 102 is engaged with a second bevel gear 104, which is coupled to an axle 106 of roller wheel 14. Thus, rotation of first bevel gear 102 causes corresponding rotation of second bevel gear 104, which in turn rotates axle 106, thereby rotating roller wheel 14 about axis 20. Rotation of spur gear 96 in the opposite direction, therefore, is configured to rotate roller wheel 14 in the opposite direction as well. Drive systems 28 that utilize this arrangement may include a respective first bevel gear 102 and a respective second bevel gear 104 for each respective roller wheel of the end effector.

In the example of FIG. 21, spur gear 96 drives drive shaft 34, which in turn rotates a worm screw 108 coupled to drive shaft 34 (e.g., worm screw 108 may be positioned on drive shaft 34, or integrally formed with drive shaft 34). Worm screw 108 is engaged with a worm gear 110, which is positioned on or coupled to axle 106. Thus, rotation of worm screw 108 causes corresponding rotation of worm gear 110, which in turn rotates axle 106, thereby rotating roller wheel 14 about axis 20. Rotation of spur gear 96 in the opposite direction, therefore, is configured to rotate roller wheel 14 in the opposite direction as well. Drive systems 28 that utilize this arrangement may include a respective worm screw 108 and a respective worm gear 110 for each respective roller wheel of the end effector. Of course, other types of gears besides those illustrated in FIGS. 20-21 additionally or alternatively may be utilized in presently disclosed end effectors 10. For example, in addition to bevel and worm gear sets, other types of gears such as spiral bevel gears, and hypoid gear sets are also within the scope of the present disclosure.

As illustrated throughout the figures, but particularly apparent in FIGS. 20-21, drive systems 28 of disclosed end effectors 10 may be configured to avoid interference with objects 26 being captured, mated with, or released/launched. For example, the gears and motors may be positioned under, beside, or out of the way from outer perimeter 52 (FIG. 1) defined by roller wheels 14, 16, 18. Additionally or alternatively, housing 98 and/or other components of support element 56 and/or support base 38 may be configured to at least partially shield or enclose one or more gears of drive system 28 and/or otherwise prevent passive receptacle 44 or object 26 from becoming entangled with the gears. For example, as shown in FIGS. 20-21, spur gears 96 may be separated from roller wheel 14 by housing 98. Additionally or alternatively, first bevel gear 102, second bevel gear 104, worm screw 108, and/or worm gear 110 may be at least partially positioned within, at least partially shielded by, or at least partially enclosed by, housing 98. In other words, end effectors 10 may be configured such that roller wheels 14, 16, 18 are the only moving parts that passive receptacles 44 and objects 26 may contact during capture of the object, because the gears and axles and drive shafts of drive system 28 may be substantially shielded via housing 98 and other support elements 56.

Figure 22:
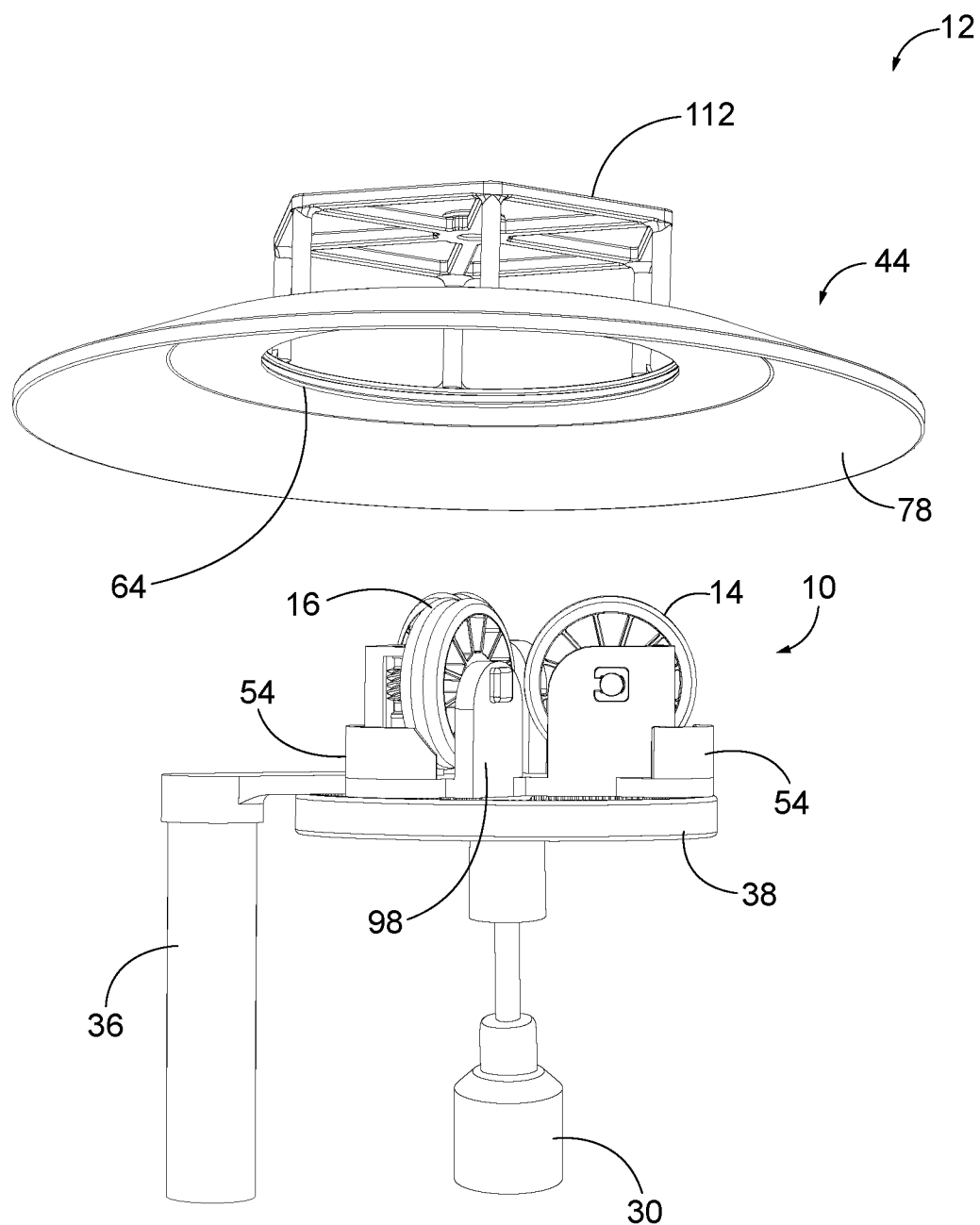
FIG. 22 is a side elevation view of an example of a passive receptacle being captured by an example of an end effector according to the present disclosure.

FIG. 22 shows an example of passive receptacle 44 hovering just above end effector 10, just before capture by engaging the ring with the roller wheels and pulling the passive receptacle down over the roller wheels of end effector 10. In the example of FIG. 22, passive receptacle 44 is shown as a ring receptacle 64, that includes tapered edge guide 78 and a ring attachment structure 112, which may be sized and shaped to fit over and around roller wheels 14, 16, 18 when the object is captured (e.g., when passive receptacle 44 is grasped by end effector 10). In other examples, passive receptacle 44 may simply be a ring, or a ring with ring attachment structure 112 without tapered edge guide 78. In some examples, tapered edge guide 78 may be stepped, rather than tapered. Ring attachment structures 112 may be larger or smaller, or different designs in various examples of systems 12. Similarly, the skirts or edge guides 78 may be larger or smaller in various examples of passive receptacles 44. Object 26 is not shown in FIG. 22, for clarity, though it is to be understood that an object 26 is coupled to or integrally formed with passive receptacle 44, such as via ring attachment structure 112.

Figure 23:
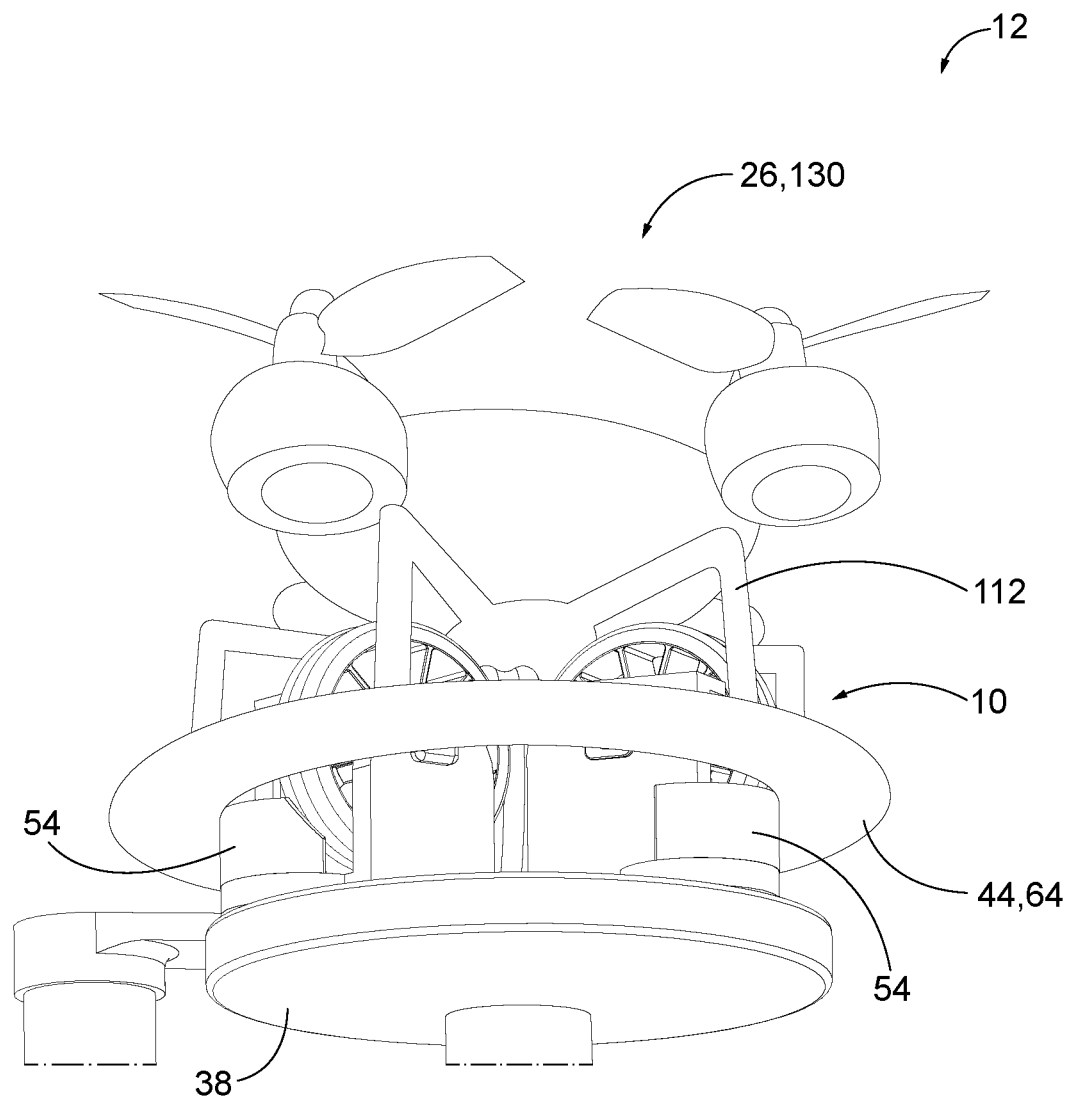
FIG. 23 is a side elevation view of an example of a UAV captured by a presently disclosed end effector, via a passive receptacle.

As shown in FIG. 23, ring attachment structure 112 may be configured to support object 26 above end effector 10 when object 26 is captured by end effector 10 via passive receptacle 44. For example, FIG. 23 shows object 26 in the form of a UAV 130 coupled to ring attachment structure 112 of ring receptacle 64. As shown, ring attachment structure 112 may be configured to both couple passive receptacle 44 to object 26, and also prevent object 26 from contacting roller wheels 14, 16, 18 when object 26 is captured by end effector 10. For example, ring attachment structure 112 may be sized and shaped to fit atop or over the roller wheels of end effector 10 such that the ring attachment structure 112 itself need not contact the roller wheels in some examples, and such that object 26 (e.g., UAV 130) is held away from the roller wheels as well. Thus, in some examples, passive receptacle 44 may be configured such that ring receptacle 64 contacts the roller wheels to capture passive receptacle 44 (and thereby object 26), while also separating other components (e.g., ring attachment structure 112 and object 26) from the roller wheels. FIG. 23 shows passive receptacle 44 at rest on end effector 10 (e.g., with passive receptacle 44 being grasped, or captured, by end effector 10). In this configuration, ring receptacle 64 has been pulled towards support base 38, past the centerlines of each roller wheel, such that the ring of ring receptacle 64 rests on, or is pressed against, stop structure 54. In this configuration, the ring of ring receptacle 64 is positioned about the outer perimeter 52 of the roller wheels of end effector 10. FIG. 23 shows an example of ring receptacle 64 having a ring with a smaller profile shape than the example of FIG. 22.

Figure 24:
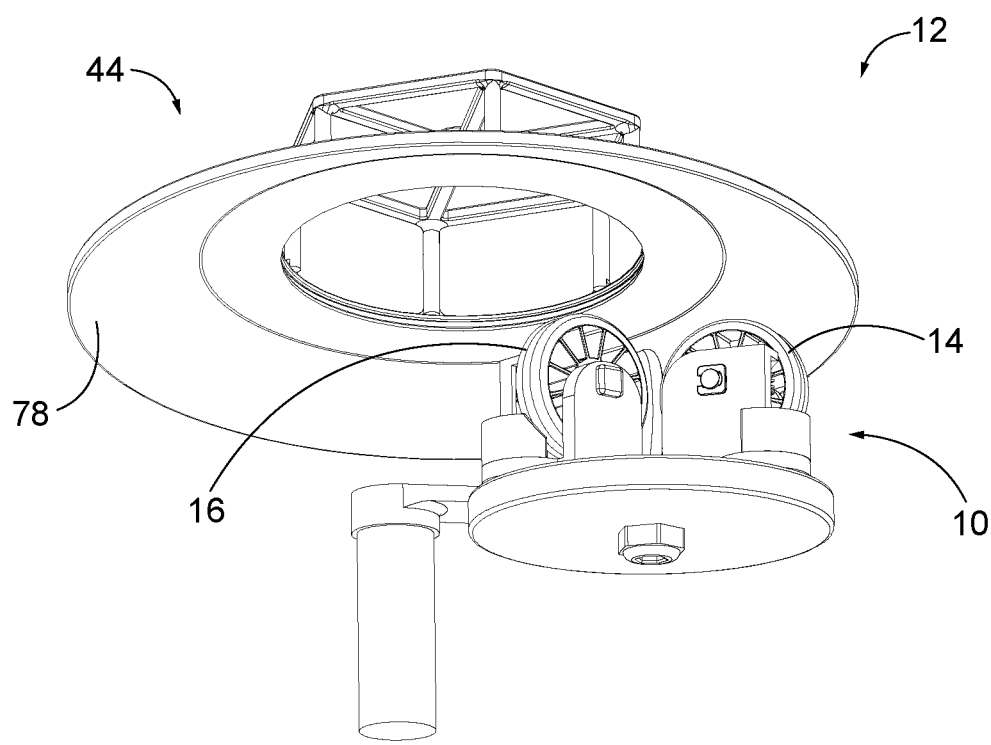
FIG. 24 is a perspective view of an example of presently disclosed end effectors, configured to correct for position misalignment of a passive receptacle.
Figure 25:
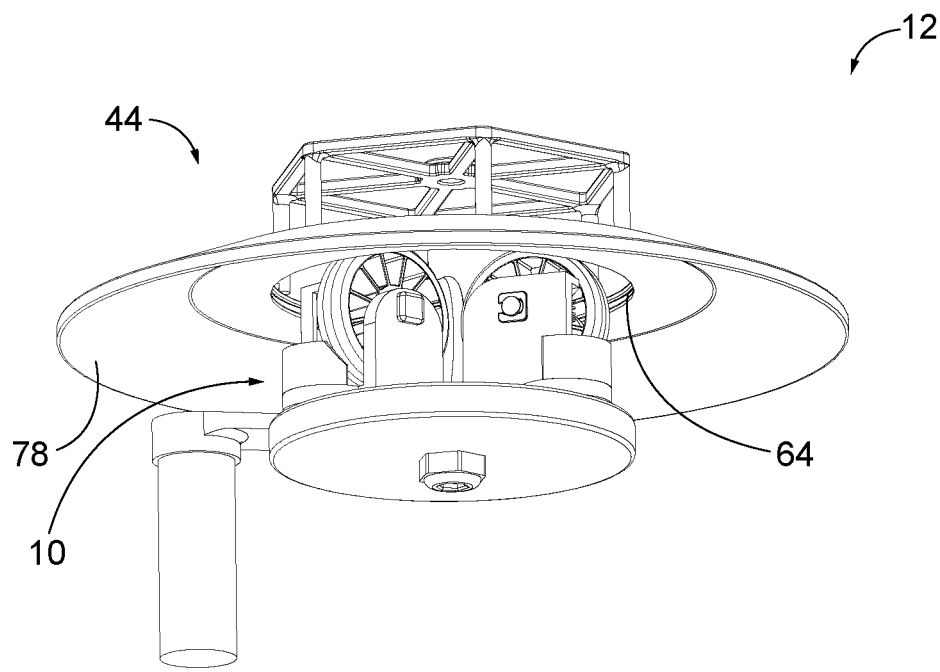
FIG. 25 shows the passive receptacle and end effector of FIG. 24, with the passive receptacle captured by the end effector.

FIGS. 24-25 illustrate an example of capturing an object 26 with positional misalignment, via tapered edge guide 78 of passive receptacle 44. In the example of FIG. 24, passive receptacle 44 has approached end effector 10, though it is misaligned from the roller wheels. Rather than being centered over all of the roller wheels of end effector 10, passive receptacle 44 is positionally misaligned such that tapered edge guide 78 contacts just roller wheel 14 at the point of initial contact with end effector 10. However, rotation of roller wheel 14 urges passive receptacle 44 into positional alignment, via friction applied to tapered edge guide 78 by roller wheel 14. Thus, end effector 10 may be configured to account for such positional misalignment and automatically urge passive receptacle 44 into the correct alignment substantially centered over the roller wheels, as shown in FIG. 25.

Figure 26:
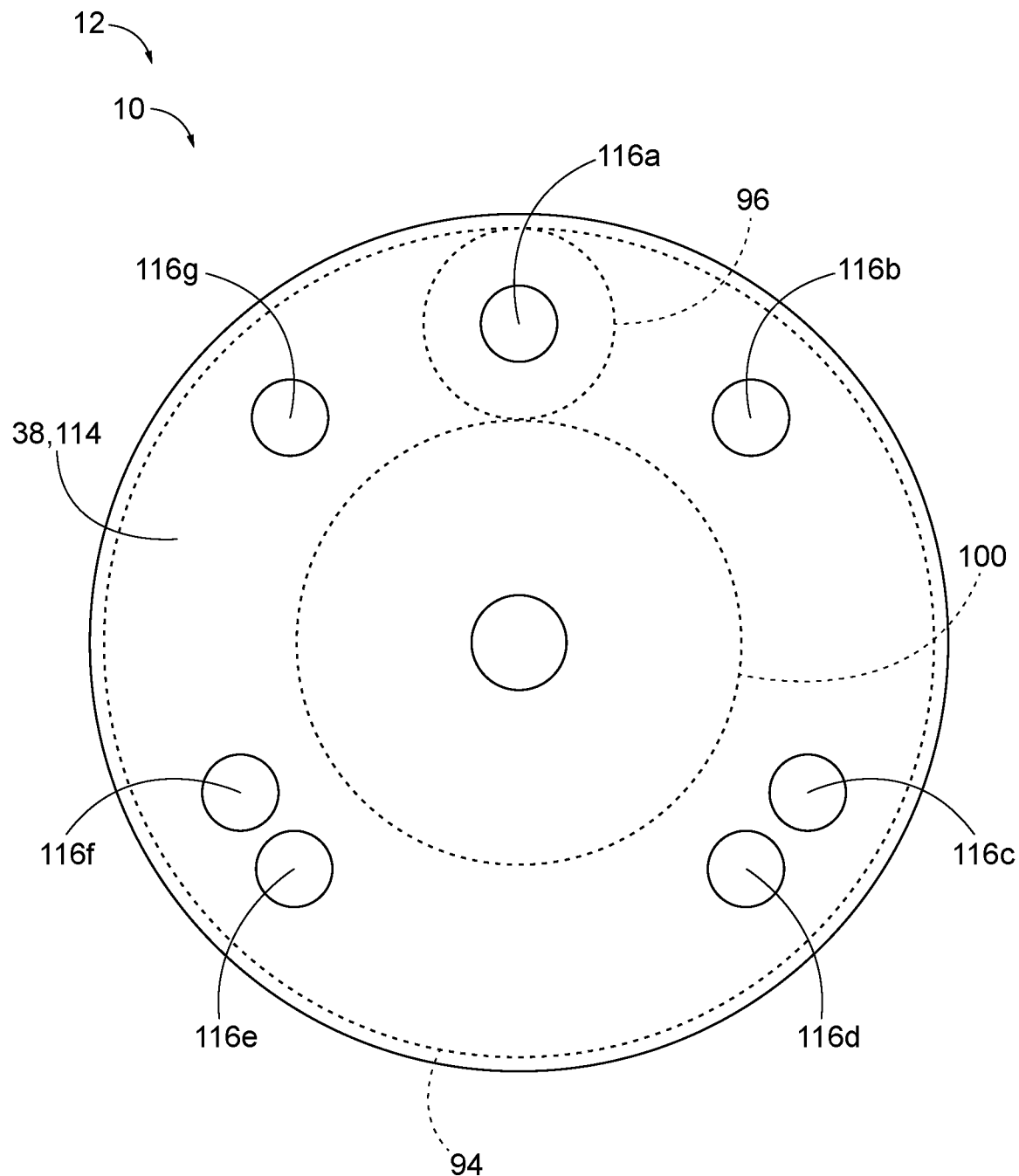
FIG. 26 is a top plan schematic representation of a modular central hub for presently disclosed end effectors.

End effectors 10 may be modular such that they may be selectively set up differently for different tasks. For example, FIG. 26 illustrates an example of a shaft plate, or central hub 114, which may be an example of, incorporated into, or coupled to support base 38. Central hub 114 may include a plurality of drive shaft mounts 116. For example, drive shaft mounts 116 may be holes formed through central hub 114, or other forms of structural attachment points of central hub 114, for receiving different numbers of drive shafts 34 in different positions as described herein. In some examples, central hub 114 may include bearings (e.g., ball bearings or journal bearings) in the drive shaft mounts 116. The example of central hub 114 of FIG. 26 includes seven drive shaft mounts 116, individually labeled as 116a, 116b, 116c, 116d, 116e, 116f, and 116g, for illustrative purposes. Other examples of central hub 114 may include more or fewer drive shaft mounts 116, and/or drive shaft mounts 116 in different positions or arrangements than shown in the example. The placement of drive shaft mounts 116 may be configured to facilitate reconfiguration of end effector 10 to have different numbers of the roller wheels, which may enable disclosed end effectors 10 to be set up differently for various different tasks. Such a modular configuration can allow for selective addition or subtraction of drive shafts 34 from central hub 114 in a more efficient and simpler manner than creating systems with multiple different hubs or plates for different arrangements of drive shafts 34 and different numbers of roller wheels. Of course, such systems with multiple different hubs or plates for different arrangements of drive shafts 34 also are within the scope of the present disclosure.

Such modular functionality can create different numbers of drive shafts 34 for driving different numbers of roller wheels. For example, in an implementation having two roller wheels, drive shafts 34 may be mounted to (and/or may extend through) central hub 114 via drive shaft mounts 116d and 116g, or via drive shaft mounts 116b and 116e, either combination of which would allow for at least substantially equidistant spacing between two drive shafts 34 positioned through the respective drive shaft mounts that are at least substantially 180 degrees apart (though said equidistant spacing is not a requirement for variations of end effectors 10 having two drive shafts 34). Similarly, in an implementation having three roller wheels, drive shafts 34 may be mounted to (and/or may extend through) central hub 114 via drive shaft mounts 116a, 116c, and 116f, which would allow for at least substantially equidistant spacing between three drive shafts 34 positioned through the respective drive shaft mounts that are at least substantially 120 degrees apart (though said equidistant spacing is not a requirement for variations of end effectors 10 having three drive shafts 34). In an implementation having four roller wheels, drive shafts may be mounted to (and/or may extend through) central hub 114 via drive shaft mounts 116b, 116d, 116e, and 116g, which would allow for substantially equidistant spacing between four drive shafts positioned through the respective drive shaft mounts that are at least substantially 90 degrees apart (though said equidistant spacing is not a requirement for variations of end effectors 10 having four drive shafts 34). Of course, other variations are also within the scope of the present disclosure, with or without substantially equidistant spacing between respective drive shafts 34 and corresponding roller wheels.

Figure 27:
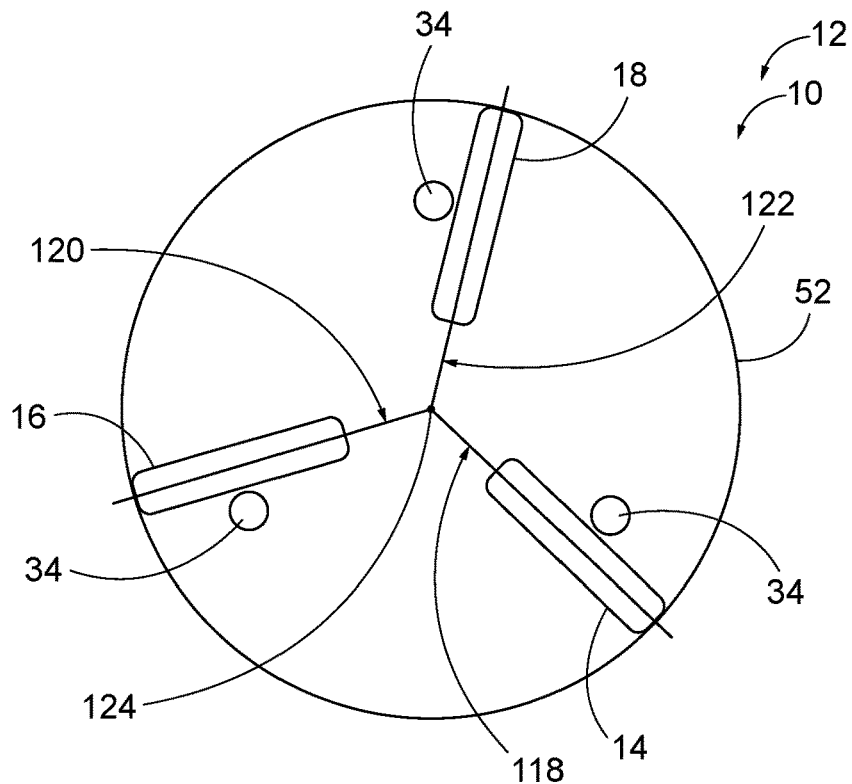
FIG. 27 is a top plan schematic representation of non-exclusive examples of presently disclosed end effectors configured to be selectively adjusted for various ring receptacle sizes and/or angles of roller wheels, shown in a first configuration.
Figure 28:
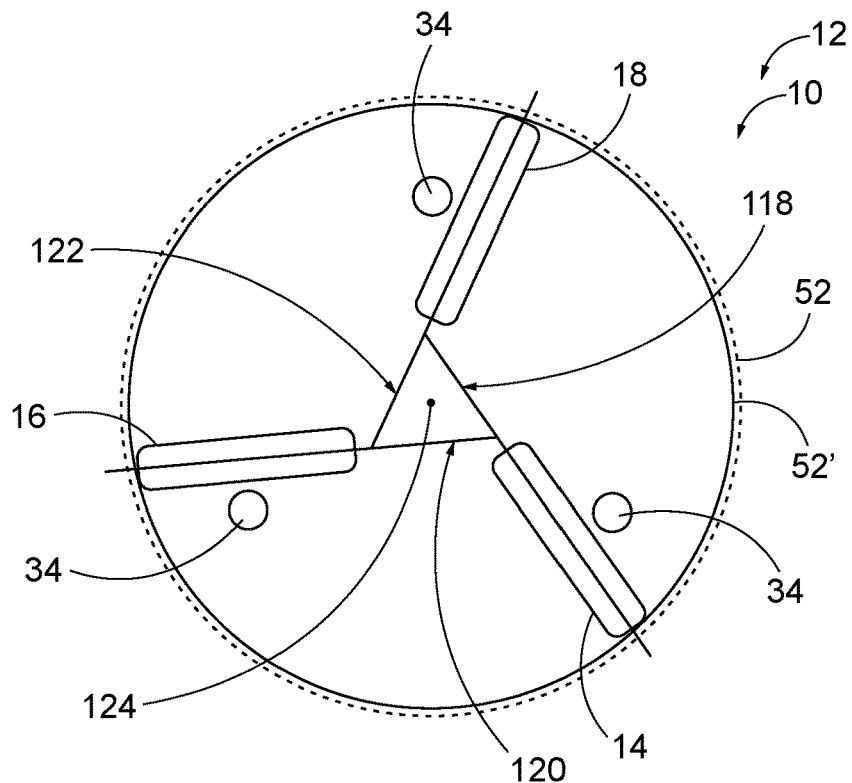
FIG. 28 is a top plan schematic representation of non-exclusive examples of presently disclosed end effectors of FIG. 27, shown in a second configuration.

In some examples, end effector 10 may be configured such that the angle of roller wheels 14, 16, 18 and/or the diameter of outer perimeter 52 may be selectively adjustable. For example, FIGS. 27-28 schematically represent top plan views of non-exclusive examples of end effectors 10 that may be selectively adjusted in this manner. In FIG. 27, roller wheels 14, 16, 18 are shown in a first configuration. In this first configuration, first roller wheel 14 is aligned in, or defines, a first plane 118, second roller wheel 16 is aligned in, or defines, a second plane 120, and third roller wheel 18 is aligned in, or defines, a third plane 122. In this example, each of first plane 118, second plane 120, and third plane 122 are oriented with respect to one another such that they are each non-perpendicular and non-parallel to each of the other respective planes. Roller wheels 14, 16, 18 define outer perimeter 52, about which a ring receptacle 64 may be grasped by end effector 10. In this example, first plane 118, second plane 120, and third plane 122 all intersect one another at or near a geometric center 124 of end effector 10.

As compared to FIG. 27, FIG. 28 illustrates the same end effector 10 in a second configuration, in which each of roller wheels 14, 16, 18 have been rotated clockwise a relatively small amount with respect to its respective drive shaft 34. As a result of the rotation of roller wheels 14, 16, 18, the diameter of outer perimeter 52 is reduced—in FIG. 28, the original outer perimeter 52 from FIG. 27 is shown in dashed line, while the reduced diameter outer perimeter 52' of the second configuration of FIG. 28 is shown in solid line. Thus, end effectors 10 may be selectively adjusted to mate with or capture differently sized ring receptacles 64 by selectively adjusting the size of outer perimeter 52 via the orientation of roller wheels 14, 16, 18. Additionally or alternatively, end effectors 10 may be selectively adjusted to provide different levels of pressure to passive receptacles 44 being captured by virtue of the changes to outer perimeter 52. The angle of roller wheels 14, 16, 18 may be adjusted to reduce the diameter of outer perimeter 52 to a greater extent than shown, or to increase the diameter of outer perimeter 52. In some examples, similar results may be obtained for examples of end effectors 10 configured to capture post receptacles 80—namely, the angles and spacing of roller wheels 14, 16, 18 may be selectively adjusted to create a larger or smaller interior space between roller wheels 14, 16, 18, for interfacing with larger or smaller posts 84 and enlarged nubs 86, and/or for adjusting the level of pressure applied to the post and/or the enlarged nubs by roller wheels 14, 16, 18. These selective adjustments of end effectors 10 can facilitate the use of end effectors 10 with different sizes of passive receptacles 44 without changing the size of roller wheels 14, 16, 18, though the size of roller wheels 14, 16, 18 may be selectively changed in various examples, additionally or alternatively to adjust the angles and/or positions of the roller wheels.

As a result of the change in orientation of roller wheels 14, 16, 18, their respective planes also are shifted such that they do not intersect at center 124 in the configuration shown in FIG. 28. For example, first plane 118 still intersects second plane 120 and third plane 122 at a non-parallel and non-perpendicular angle (and second plane 120 still intersects third plane 122 at a non-parallel and non-perpendicular angle, as well), though they do not all intersect one another in the same location or along the same line.

Figure 29:
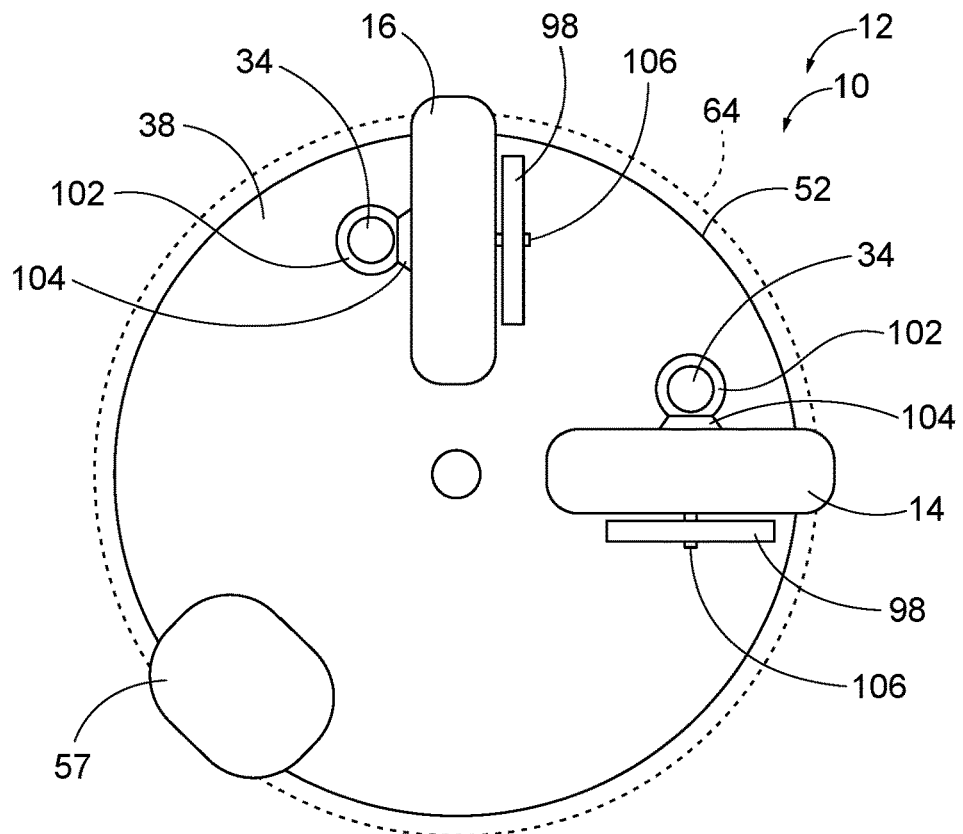
FIG. 29 is a top plan schematic representation of an example of presently disclosed end effectors having two roller wheels and a backstop.
Figure 30:
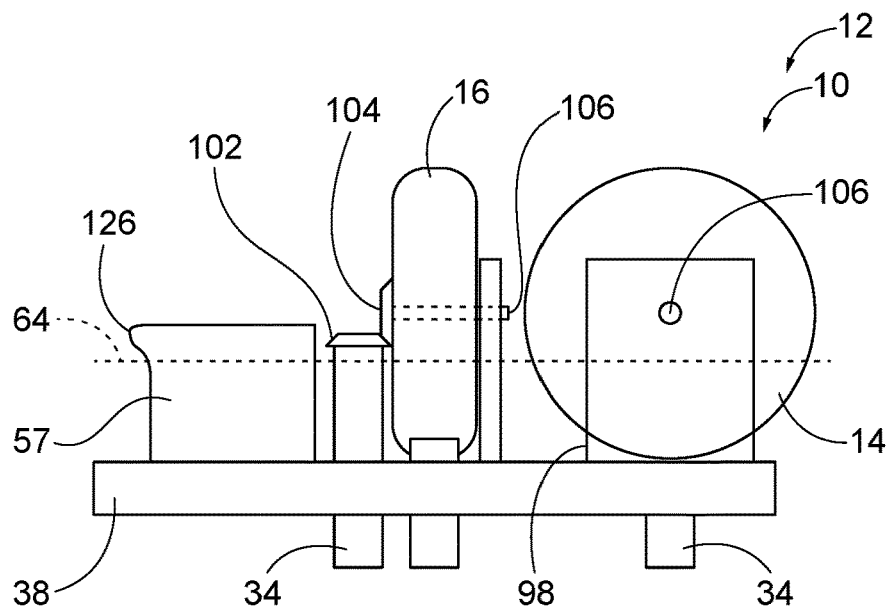
FIG. 30 is a side elevation schematic representation of an example of presently disclosed end effectors having two roller wheels and a backstop.

FIGS. 29-30 schematically represent examples of end effectors 10 having just two roller wheels 14, 16, along with backstop 57. As shown in FIGS. 29-30, roller wheels 14 and 16 may be arranged such that they are substantially perpendicular to one another, though in some examples, roller wheels 14, 16 may be arranged differently, such as in non-perpendicular planes with respect to one another. Backstop 57 may be positioned with respect to roller wheels 14, 16 such that it serves to define the desired size outer perimeter 52 for engaging with a ring receptacle 64 being grasped by end effector 10. The illustrated example is implemented via bevel gears 102, 104, though other examples may utilize a worm screw 108 and worm gear 110, or other implementations. Dashed line 64 represents ring receptacle 64 captured by end effector 10, such that ring receptacle 64 is positioned about the outer surfaces of roller wheels 14, 16 and backstop 57. As shown, backstop 57 may include a projection, or lip, 126 to aid in retaining ring receptacle 64 on end effector 10.

Figure 31:
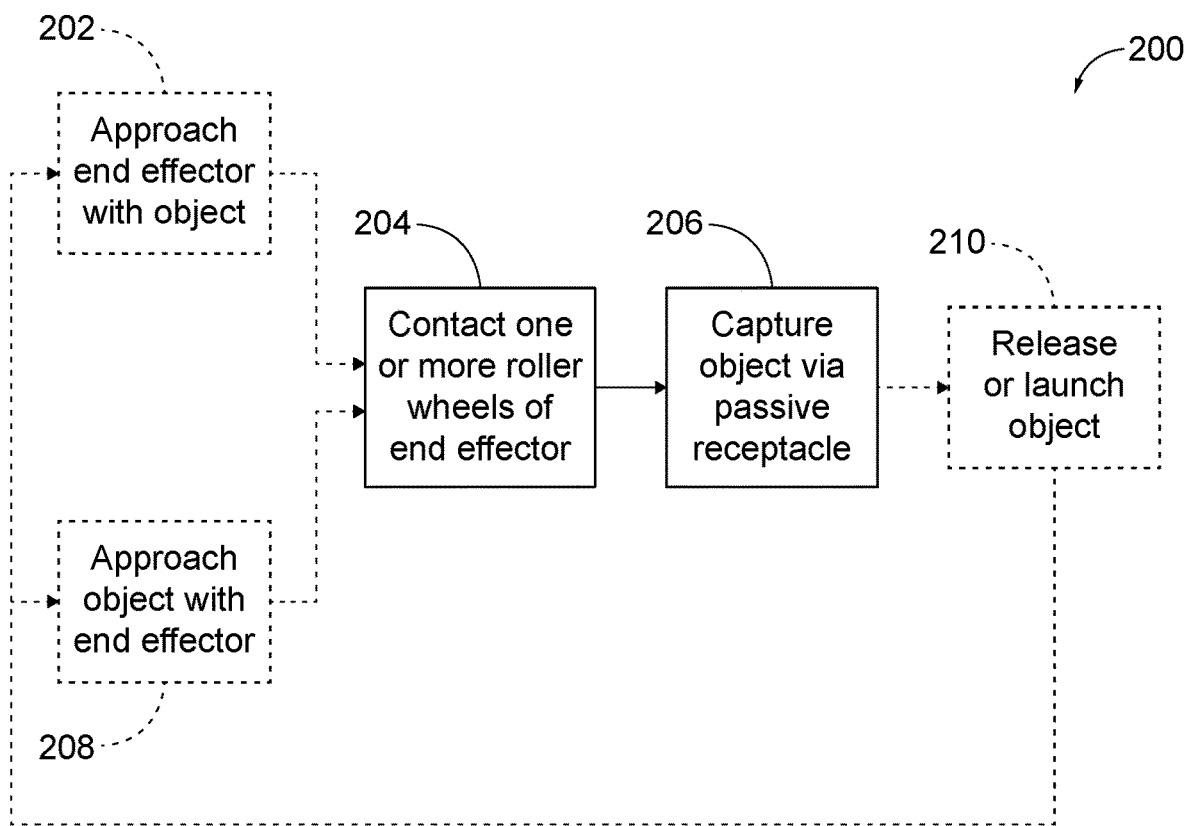
FIG. 31 is a schematic flowchart diagram illustrating methods according to the present disclosure.

FIG. 31 schematically provides a flowchart that represents illustrative, non-exclusive examples of methods 200 according to the present disclosure. In FIG. 31, some steps are illustrated in dashed boxes indicating that such steps may be optional or may correspond to an optional version of a given method 200 according to the present disclosure. That said, not all methods 200 according to the present disclosure are required to include the steps illustrated in solid boxes. The methods 200 and steps illustrated in FIG. 31 are not limiting and other methods and steps are within the scope of the present disclosure, including methods having greater than or fewer than the number of steps illustrated, as understood from the discussions herein.

Methods 200 generally include approaching an end effector (e.g., end effector 10) with a passive receptacle of an object being captured (e.g., passive receptacle 44 of object 26), at 202. As the object gets closer to the end effector with the passive receptacle facing, or oriented towards, the roller wheels (e.g., roller wheels 14, 16, 18) of the end effector, the passive receptacle is brought into contact with one or more roller wheels at 204. For example, contacting one or more roller wheels at 204 may include contacting an inward-facing surface of one or more roller wheels with an enlarged nub of a post receptacle (e.g., enlarged nub 86 of post receptacle 80), or contacting an outward facing surface and/or upper surface of one or more roller wheels with a ring of a ring receptacle (e.g., ring receptacle 64). The roller wheels typically will already have been rotating as the object approaches the end effector, thus, once the passive receptacle contacts one or more of the roller wheels of the end effector, the motion of the roller wheels serves to pull the passive receptacle onto or into the end effector, thereby capturing the object by grasping the passive receptacle at 206.

Additionally or alternatively, methods 200 may include approaching an object (e.g., a passive receptacle 44 of the object) with the end effector at 208 to contact one or more roller wheels with the passive receptacle at 204, and capture the object via the passive receptacle at 206. In other words, in various methods 200, the end effector may be substantially stationary while the object approaches the end effector, the object may be substantially stationary while the end effector approaches the object, and/or both the end effector and the object may be moved towards one another to capture or mate with one another.

Capturing the object at 206 includes rotating the roller wheels to pull at least a portion of the passive receptacle past the respective centerlines of the roller wheels such that it is effectively locked onto or between the roller wheels of the end effector (which may be referred to as a locked configuration). In the locked configuration, the end effector is configured such that the passive receptacle will remain grasped by the roller wheels even when the drive system is turned off and the roller wheels are stationary. To capture the object at 206, the passive receptacle may be grasped by the roller wheels such that the passive receptacle is positioned exteriorly about an outer perimeter defined by the roller wheels, when the object is captured. Additionally or alternatively, capturing the passive receptacle at 206 may include grasping the passive receptacle such that the passive receptacle is positioned interiorly to and between the first roller wheel and the second roller wheel. In some examples, capturing the passive receptacle at 206 includes drawing the enlarged nub of the passive receptacle past the first centerline of the first roller wheel and the second centerline of the second roller wheel. Additionally or alternatively, capturing the passive receptacle at 206 may include automatically locking the passive receptacle in place between the first roller wheel and the second roller wheel and one or more stop structures of the end effector (e.g., stop structures 54) or stop structures of the passive receptacle itself (e.g., base plate 82). In some examples, capturing the passive receptacle at 206 comprises engaging an upper surface of the roller wheels with the base plate of the post receptacle, such that the base plate is configured to act as a stop structure that limits movement of the object with respect to the end effector. Processors or controllers of disclosed systems may utilize one or more decision steps to determine whether the target object has been captured, and thus whether to continue rotating the roller wheels for the capture configuration, whether to stop the roller wheels, and/or whether to reverse the roller wheels for the launch/release configuration of the end effector.

To this end, methods 200 may include launching or releasing the object from the end effector at 210. Launching or releasing the object from the end effector at 210 may be accomplished by reversing directions of rotation of the roller wheels, such that the passive receptacle and the object are pushed off of and/or away from the roller wheels of the end effector. In releasing or launching the object at 210, the roller wheels push or force at least a portion of the passive receptacle backwards past the respective centerlines of the roller wheels until the passive receptacle is pushed off of the end effector via the roller wheels. In some methods 200, after the object is launched at 210 it may later be captured and/or mated to the end effector by approaching the end effector with the object at 202 and/or approaching the object with the end effector at 208, to initiate the capture sequence.

Methods 200 may be performed to capture, mate with, and/or release a UAV or other type of aircraft or object. In other examples, methods 200 may be performed to, for example, grab a cable or grab an object lifted by a cable, or pick up and/or move a package or a load via the capturing the object at 206. In other examples, methods 200 may be performed for applications involving mating components, such as in manufacturing (e.g., robotic material handling), capturing the refueling probe of an aerial refueling system, and agriculture usages (e.g., picking fruit and other agricultural products). Methods 200 may also be used in underwater applications, such as by an autonomous underwater vehicle (AUV) or a remotely operated vehicle (ROV).

Illustrative, non-exclusive examples of inventive subject matter according to the present disclosure are described in the following enumerated paragraphs:

A1. An end effector, comprising:
a first roller wheel configured to rotate in a first plane; and
a second roller wheel configured to rotate in a second plane, wherein the second plane is non-parallel to the first plane, wherein the first roller wheel and the second roller wheel are arranged with respect to one another such that the end effector is configured to capture an object via the first roller wheel and the second roller wheel, and such that the end effector is further configured to selectively release the object from the first roller wheel and the second roller wheel.

A2. The end effector of paragraph A1, further comprising a drive system configured to rotate the first roller wheel and the second roller wheel.

A3. The end effector of paragraph A2, wherein the drive system comprises a drive shaft operatively coupled to the first roller wheel and the second roller wheel such that the drive shaft is configured to transfer rotational movement from a motor to both the first roller wheel and the second roller wheel.

A4. The end effector of paragraph A2 or A3, wherein the drive system comprises a/the motor configured to drive the first roller wheel and the second roller wheel.

A5. The end effector of any of paragraphs A2-A4, wherein the drive system comprises a central control gear and a plurality of radially spaced spur gears, wherein the central control gear is configured to rotate the plurality of radially spaced spur gears, wherein each respective spur gear is configured to drive a respective roller wheel.

A5.1. The end effector of paragraph A5, wherein the central control gear is positioned centrally between the plurality of radially spaced spur gears.

A6. The end effector of any of paragraphs A2-A5.1, wherein the drive system comprises a respective bevel gear for each respective roller wheel.

A7. The end effector of any of paragraphs A2-A5.1, wherein the drive system comprises a respective worm gear for each respective roller wheel.

A8. The end effector of any of paragraphs A2 or A5-A7, wherein the drive system comprises a respective motor for each respective roller wheel.

A9. The end effector of any of paragraphs A2-A8, wherein the drive system comprises an external control gear ring configured to rotate a/the plurality of radially spaced spur gears, wherein each respective spur gear is configured to drive a respective roller wheel.

A10. The end effector of any of paragraphs A2-A9, wherein the drive system further comprises a limit switch configured to stop the first roller wheel and/or the second roller wheel after the object is captured.

A11. The end effector of any of paragraphs A1-A10, wherein the first roller wheel is configured to be selectively reversed between two opposite directions of rotation, and wherein the second roller wheel is configured to be selectively reversed between two opposite directions of rotation.

A11.1. The end effector of any of paragraphs A1-A11, wherein the first roller wheel is configured to be selectively varied in speed, and wherein the second roller wheel is configured to be selectively varied in speed.

A12. The end effector of any of paragraphs A1-A11.1, wherein the end effector is configured to capture the object while the object floats, hovers, and/or flies above, beside, below, and/or adjacent the end effector.

A12.1. The end effector of any of paragraphs A1-A12, wherein the end effector is configured to capture a stationary object while the end effector is moved to the stationary object.

A13. The end effector of any of paragraphs A1-A12.1, wherein the end effector is configured to capture the object when the object is misaligned from the end effector along multiple positional and/or rotational axes.

A13.1. The end effector of any of paragraphs A1-A13, wherein the end effector is configured to capture the object from a full 360 degree range of heading angles.

A14. The end effector of any of paragraphs A1-A13.1, wherein the end effector is coupled to a support structure.

A15. The end effector of paragraph A14, wherein the support structure comprises an arm, a pole, a handle, and/or a platform.

A16. The end effector of any of paragraphs A1-A15, wherein the end effector is configured for manual operation.

A17. The end effector of any of paragraphs A1-A16, wherein the end effector is configured for automated operation.

A18. The end effector of any of paragraphs A1-A17, wherein the end effector is configured to be implemented using a robotic device, a transportation device, a stationary robotic arm, a land-based system, a mobile robot, and/or a ship-based system.

A19. The end effector of any of paragraphs A1-A18, wherein the end effector is configured to capture the object via a passive receptacle of the object.

A19.1. The end effector of paragraph A19, wherein the end effector is configured to automatically lock the passive receptacle in place once the passive receptacle is grasped and pulled past a first centerline of the first roller wheel and a second centerline of the second roller wheel.

A20. The end effector of paragraph A19 or A19.1, wherein the passive receptacle comprises a ring receptacle.

A21. The end effector of any of paragraphs A19-A20, wherein the passive receptacle comprises a post receptacle.

A22. The end effector of any of paragraphs A19-A21, wherein the end effector is configured to grasp the passive receptacle such that the passive receptacle is positioned interiorly to and between the first roller wheel and the second roller wheel, thereby capturing the object.

A23. The end effector of any of paragraphs A19-A22, wherein the end effector is configured to grasp the passive receptacle such that the passive receptacle is positioned exteriorly about an outer perimeter defined by the first roller wheel and the second roller wheel when the object is captured.

A24. The end effector of any of paragraphs A1-A23, further comprising at least one stop structure configured to support the object and limit movement of the object while the object is captured by the end effector.

A24.2. The end effector of any of paragraphs A24-A24, wherein the at least one stop structure is coupled to or forms a part of a/the passive receptacle of the object.

A25. The end effector of any of paragraphs A1-A24.1, further comprising a support element that supports the first roller wheel, the second roller wheel, and/or a/the drive system.

A26. The end effector of any of paragraphs A1-A25, wherein the object the end effector is configured to capture and selectively release comprises an aircraft.

A27. The end effector of any of paragraphs A1-A26, wherein the first roller wheel and/or the second roller wheel comprise airless tires, pneumatic tires, rubber wheels, belts, and/or solid wheels.

A28. The end effector of any of paragraphs A1-A27, wherein the first roller wheel and/or the second roller wheel are rigid, compliant, and/or compressible.

A29. The end effector of any of paragraphs A1-A28, wherein the first roller wheel and/or the second roller wheel comprise one or more compliant regions.

A30. The end effector of any of paragraphs A1-A29, wherein the first roller wheel and/or the second roller wheel have a durometer selected based on features of the object being captured.

A30.1. The end effector of any of paragraphs A1-A30, wherein the first roller wheel and/or the second roller wheel have a durometer selected based on a/the passive receptacle of the object being captured.

A31. The end effector of any of paragraphs A1-A30.1, wherein the first roller wheel and/or the second roller wheel comprises a central groove formed in a perimeter face of the first roller wheel and/or the second roller wheel.

A32. The end effector of paragraph A31, wherein the central groove is configured to improve alignment of the object as it is captured.

A32.1. The end effector of paragraph A31 or A32, further comprising a secondary feature on the perimeter face, wherein the secondary feature is configured to enhance the ability to capture the object.

A32.2. The end effector of paragraph A32.1, wherein the secondary feature comprises one or more radial grooves and/or a tread pattern.

A33. The end effector of any of paragraphs A1-A32.2, further comprising one or more additional roller wheels, wherein each respective roller wheel of the one or more additional roller wheels is configured to rotate in a respective plane that is non-parallel to the first plane and the second plane.

A34. The end effector of any of paragraphs A1-A33, further comprising a third roller wheel, wherein the third roller wheel is configured to rotate in a third plane that is non-parallel to the first plane and the second plane.

A35. The end effector of paragraph A34, wherein the first roller wheel, the second roller wheel, and the third roller wheel are arranged such that the first plane, the second plane, and the third plane intersect one another.

A36. The end effector of any of paragraphs A1-A35, further comprising a/the support element that supports the first roller wheel, the second roller wheel, a/the third roller wheel, a/the stop structure, a backstop, and/or a/the drive system.

A37. The end effector of any of paragraphs A1-A36, wherein the end effector is configured to be modular, such that the end effector is selectively reconfigurable with different numbers of roller wheels, multiple drive shaft mounts, and/or structural attachment points.

A38. The end effector of any of paragraphs A1-A37, further comprising a/the backstop positioned to engage with the object when the object is captured by the first roller wheel and the second roller wheel.

A39. An end effector, comprising:
a plurality of roller wheels, wherein the plurality of roller wheels comprises:
a first roller wheel;
a second roller wheel;
a third roller wheel; and
at least one or more additional roller wheels;
a drive system configured to selectively rotate the plurality of roller wheels, wherein the drive system is configured such that each roller wheel of the plurality of roller wheels is selectively reversible between a first direction of rotation and a second, opposite, direction of rotation; and
a support base configured to support the plurality of roller wheels such that the plurality of roller wheels are arranged with respect to one another such that the end effector is configured to capture an object via rotation of the plurality of roller wheels, wherein the end effector is further configured to selectively release the object from the plurality of roller wheels by reversing rotation of the plurality of roller wheels, and wherein at least one roller wheel of the plurality of roller wheels is arranged in a first plane that is non-parallel to a second plane in which at least one other roller wheel of the plurality of roller wheels is arranged.

B1. A system, comprising:
the end effector of any of paragraphs A1-A39;
a/the support structure, wherein the end effector is coupled to and supported by the support structure; and
the object which the end effector is configured to capture.

B2. The system of paragraph B1, wherein the support structure comprises a/the arm, a/the pole, a/the handle, and/or a/the platform.

B3. The system of any of paragraphs B1-B2, wherein the support structure comprises a ship or other marine vessel, an underwater vehicle, a spacecraft, an aircraft, a stationary robot, a mobile robot, a transportation device, a robotic device, and/or a land-based surface or structure.

B4. The system of any of paragraphs B1-B3, wherein the end effector is coupled to the support structure via an adjustable joint angle.

B5. The system of any of paragraphs B1-B4, wherein the object comprises an unmanned aerial vehicle.

B6. The system of any of paragraphs B1-B5, wherein the object comprises a/the passive receptacle that is configured to engage with the end effector when the object is captured.

B7. The system of paragraph B6, wherein the passive receptacle comprises a/the ring receptacle.

B8. The system of paragraph B6 or B7, wherein the passive receptacle comprises a/the post receptacle.

B8.1. The system of paragraph B8, wherein the post receptacle comprises an elongated post or peg that extends to a distal end that comprises an enlarged nub, wherein when the object is captured by the end effector, the enlarged nub is drawn past a/the first centerline of the first roller wheel and a/the second centerline of the second roller wheel.

B8.2. The system of paragraph B8.1, wherein the post receptacle comprises a base plate coupled to a proximal end of the elongated post or peg, wherein the base plate is configured to engage an upper surface of the first roller wheel and an upper surface of the second roller wheel when the object is captured by the end effector.

B9. The system of any of paragraphs B6-B8.2, wherein the end effector is configured to grasp the passive receptacle such that the passive receptacle is positioned interiorly to and between the first roller wheel and the second roller wheel, thereby capturing the object.

B10. The system of any of paragraphs B6-B9, wherein the end effector is configured to grasp the passive receptacle such that the passive receptacle is positioned exteriorly about an/the outer perimeter defined by the first roller wheel and the second roller wheel when the object is captured.

B11. The system of any of paragraphs B6-B10, wherein the passive receptacle comprises a tapered edge guide or skirt around an outer perimeter of the passive receptacle, wherein the tapered edge guide or skirt is configured to facilitate capture of the object by the end effector even when only one roller wheel of the end effector contacts the passive receptacle.

B12. The system of any of paragraphs B1-B11, wherein the object comprises a package, a load, a cable end, and/or an emergency device that is configured to carry and/or lift a person or animal.

C1. A method of capturing an object, the method comprising:
approaching an end effector with a passive receptacle of the object, wherein the end effector comprises the end effector of any of paragraphs A1-A39;
contacting the first roller wheel and/or the second roller wheel with the passive receptacle; and
capturing the passive receptacle via the end effector by rotating the first roller wheel in a first direction and rotating the second roller wheel in a second direction, thereby pulling at least a portion of the passive receptacle past a/the first centerline of the first roller wheel and past a/the second centerline of the second roller wheel.

C2. The method of paragraph C1, wherein the passive receptacle comprises a/the ring receptacle.

C3. The method of paragraph C1 or C2, wherein the capturing the passive receptacle comprises grasping the passive receptacle such that the passive receptacle is positioned exteriorly about an outer perimeter defined by the first roller wheel and the second roller wheel when the object is captured.

C4. The method of any of paragraphs C1-C3, wherein the capturing the passive receptacle comprises automatically locking the passive receptacle in place between the first roller wheel and the second roller wheel and one or more stop structures of the end effector.

C5. The method of any of paragraphs C1-C4, wherein the passive receptacle comprises a/the post receptacle.

C6. The method of paragraph C5, wherein the post receptacle comprises an elongated post or peg that extends to a distal end that comprises an enlarged nub.

C7. The method of paragraph C6, wherein the capturing the passive receptacle comprises drawing the enlarged nub past the first centerline of the first roller wheel and the second centerline of the second roller wheel.

C8. The method of any of paragraphs C5-C7, wherein the post receptacle comprises a base plate coupled to a proximal end of a/the elongated post or peg, and wherein the capturing the passive receptacle comprises engaging an upper surface of the first roller wheel and an upper surface of the second roller wheel with the base plate of the post receptacle.

C8.1. The method of paragraph C8, wherein the base plate is configured to act as a stop structure that limits movement of the object with respect to the end effector.

C9. The method of any of paragraphs C1-C8.1, wherein the capturing the passive receptacle comprises grasping the passive receptacle such that the passive receptacle is positioned interiorly to and between the first roller wheel and the second roller wheel.

C10. The method of any of paragraphs C1-C9, further comprising launching or releasing the object from the end effector.

C11. The method of paragraph C10, wherein the launching or releasing the object from the end effector comprises reversing directions of rotation of the first roller wheel and the second roller wheel.

C12. The method of paragraph C10 or C11, wherein the launching or releasing the object from the end effector comprises:
rotating the first roller wheel in a third direction, wherein the third direction is opposite from the first direction; and
rotating the second roller wheel in a fourth direction, wherein the fourth direction is opposite from the second direction, thereby pushing at least a portion of the passive receptacle backwards past the first centerline of the first roller wheel and the second centerline of the second roller wheel until the passive receptacle is pushed off of the end effector via the first roller wheel and the second roller wheel.

C13. The method of any of paragraphs C1-C12, wherein the capturing the passive receptacle comprises picking up and/or moving a package or a load.

D1. The use of the end effector of any of paragraphs A1-A39 to capture and/or release an aerial vehicle.

D2. The use of the end effector of any of paragraphs A1-A39 to lift and/or load a package or load.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. An end effector, comprising:
    a first roller wheel configured to rotate in a first plane;
    a second roller wheel configured to rotate in a second plane, wherein the second plane is non-parallel to the first plane; and
    a third roller wheel, wherein the third roller wheel is configured to rotate in a third plane that is non-parallel to the first plane and the second plane, wherein the first roller wheel, the second roller wheel, and the third roller wheel are arranged with respect to one another such that the end effector is configured to automatically capture an object when a passive receptacle of the object contacts the first roller wheel, the second roller wheel, and the third roller wheel, wherein the end effector is further configured to selectively release the object from the first roller wheel, the second roller wheel, and the third roller wheel, and wherein the end effector is configured to automatically retain the object until the end effector is caused to selectively release the object.

2. The end effector according to claim 1, further comprising a drive system configured to rotate the first roller wheel, the second roller wheel, and the third roller wheel, wherein the drive system comprises a drive shaft operatively coupled to the first roller wheel, the second roller wheel, and the third roller wheel such that the drive shaft is configured to transfer power from a motor to the first roller wheel, the second roller wheel, and the third roller wheel.

3. The end effector according to claim 2, wherein the drive system comprises a central control gear and a plurality of radially spaced spur gears, wherein the central control gear is configured to rotate the plurality of radially spaced spur gears, wherein each respective spur gear is configured to drive a respective roller wheel, and wherein the central control gear is positioned centrally between the plurality of radially spaced spur gears.

4. The end effector according to claim 2, wherein the drive system comprises an external control gear ring configured to rotate a plurality of radially spaced spur gears, wherein each respective spur gear is configured to drive a respective roller wheel.

5. The end effector according to claim 1, wherein the first roller wheel is configured to be selectively reversed between two opposite directions of rotation, wherein the second roller wheel is configured to be selectively reversed between two opposite directions of rotation, and wherein the third roller wheel is configured to be selectively reversed between two opposite directions of rotation, and wherein when the first roller wheel, the second roller wheel, and the third roller wheel are selectively reversed, the first roller wheel, the second roller wheel, and the third roller wheel are configured to push the passive receptacle away from end effector, thereby releasing the object.

6. The end effector according to claim 1, wherein the end effector is configured to capture the object from a 360 degree range of heading angles, such that the end effector is configured to accommodate positional misalignment and rotational misalignment of the object with respect to the end effector when capturing the object.

7. The end effector according to claim 1, wherein the end effector is configured to capture the object via the passive receptacle of the object, and wherein the end effector is configured to automatically lock the passive receptacle in place on the end effector once the passive receptacle is grasped and at least a portion of the passive receptacle is pulled past a first centerline of the first roller wheel, a second centerline of the second roller wheel, and a third centerline of the third roller wheel.

8. The end effector according to claim 7, wherein the end effector is configured to grasp the passive receptacle such that at least a portion of the passive receptacle is positioned interiorly to and between the first roller wheel, the second roller wheel, and the third roller wheel, thereby capturing the object.

9. The end effector according to claim 7, wherein the end effector is configured to grasp the passive receptacle such that at least a portion of the passive receptacle is positioned exteriorly about an outer perimeter defined by the first roller wheel, the second roller wheel, and the third roller wheel when the object is captured.

10. The end effector according to claim 1, wherein the first roller wheel, the second roller wheel, and the third roller wheel each comprises a respective central groove formed in a respective perimeter face of the first roller wheel, the second roller wheel, and the third roller wheel.

11. A system, comprising:
    the end effector according to claim 1;
    a support structure, wherein the end effector is coupled to and supported by the support structure; and
    the object, wherein the object comprises the passive receptacle via which the end effector is configured to capture the object.

12. The system according to claim 11, wherein the support structure comprises a ship or other marine vessel, an underwater vehicle, a spacecraft, an aircraft, a stationary robot, a mobile robot, a transportation device, a robotic device, and/or a land-based surface or structure, and wherein the object comprises an unmanned aerial vehicle.

13. The system according to claim 11, wherein the passive receptacle comprises a ring receptacle that is positioned exteriorly about an outer perimeter defined by the first roller wheel, the second roller wheel, and the third roller wheel when the object is captured.

14. The system according to claim 11, wherein the passive receptacle comprises a post receptacle having an elongated post that extends to a distal end comprising an enlarged nub, wherein when the object is captured by the end effector, the enlarged nub is drawn past a first centerline of the first roller wheel, a second centerline of the second roller wheel, and a third centerline of the third roller wheel such that the elongated post is positioned between the first roller wheel, the second roller wheel, and the third roller wheel when the object is captured by the end effector.

15. The system according to claim 14, wherein the post receptacle comprises a base plate coupled to a proximal end of the elongated post, wherein the base plate is configured to engage a first upper surface of the first roller wheel, a second upper surface of the second roller wheel, and a third upper surface of the third roller wheel when the object is captured by the end effector.

16. An end effector, comprising:
a plurality of roller wheels, wherein the plurality of roller wheels comprises:
a first roller wheel;
a second roller wheel;
a third roller wheel; and
at least one or more additional roller wheels;
a drive system configured to selectively rotate the plurality of roller wheels, wherein the drive system is configured such that each roller wheel of the plurality of roller wheels is selectively reversible between a first direction of rotation and a second, opposite, direction of rotation; and
a support base configured to support the plurality of roller wheels such that the plurality of roller wheels are arranged with respect to one another such that the end effector is configured to automatically capture an object via rotation of the plurality of roller wheels when a passive receptacle of the object contacts the plurality of roller wheels, wherein the end effector is further configured to selectively release the object from the plurality of roller wheels by reversing rotation of the plurality of roller wheels, thereby pushing the passive receptacle away from the end effector, wherein the end effector is configured to automatically retain the object until the end effector is caused to selectively release the object, and wherein at least one roller wheel of the plurality of roller wheels is arranged in a first plane that is non-parallel to a second plane in which at least one other roller wheel of the plurality of roller wheels is arranged.

17. An end effector, comprising:
a first roller wheel configured to rotate in a first plane, wherein the first roller wheel is supported by a support element;
a second roller wheel configured to rotate in a second plane, wherein the second plane is non-parallel to the first plane, and wherein the second roller wheel is supported by the support element; and
a backstop supported by the support element, wherein the backstop is positioned to engage with an object when the object is captured by the first roller wheel and the second roller wheel, wherein the first roller wheel, the second roller wheel, and the backstop are arranged with respect to one another such that the end effector is configured to capture the object via the first roller wheel, the second roller wheel, and the backstop, wherein the first roller wheel, the second roller wheel, and the backstop are arranged with respect to one another such that a passive receptacle of the object is positioned about outer surfaces of the first roller wheel, the second roller wheel, and the backstop when the object is captured by the end effector, wherein the backstop comprises a lip configured to aid in retaining the passive receptacle on the end effector when the object is captured by the end effector, and wherein the end effector is further configured to selectively release the object from the first roller wheel, the second roller wheel, and the backstop.

18. A method of capturing an object, the method comprising:
approaching an end effector with a passive receptacle of the object, wherein the end effector comprises the end effector according to claim 1;
contacting the first roller wheel, the second roller wheel, and/or the third roller wheel with the passive receptacle; and
capturing the object by capturing the passive receptacle via the end effector by rotating the first roller wheel in a first direction, rotating the second roller wheel in a second direction, and rotating the third roller wheel in a third direction, thereby pulling at least a portion of the passive receptacle past a first centerline of the first roller wheel, past a second centerline of the second roller wheel, and past a third centerline of the third roller wheel.

19. The method according to claim 18, wherein the capturing the passive receptacle comprises automatically locking the passive receptacle in place via the first roller wheel, the second roller wheel, the third roller wheel, and one or more stop structures of the end effector.

20. The method according to claim 18, further comprising launching or releasing the object from the end effector, wherein the launching or releasing the object from the end effector comprises reversing directions of rotation of the first roller wheel, the second roller wheel, and the third roller wheel, thereby pushing the passive receptacle away from the end effector.

21. The method according to claim 18, wherein the object comprises an unmanned aerial vehicle, and wherein the capturing the object comprises ending a flight of the unmanned aerial vehicle, thereby substantially ending motion of the object with respect to the end effector.

22. The method according to claim 18, further comprising launching or releasing the object from the end effector, wherein the launching or releasing the object from the end effector comprises reversing rotation of one of the first roller wheel, the second roller wheel, or the third roller wheel, thereby pushing the passive receptacle away from the end effector, while at least one other of the first roller wheel, the second roller wheel, and the third roller wheel is not reversed.

\* \* \* \* \*